United States Patent
Aoyagi

(10) Patent No.: US 10,234,925 B2
(45) Date of Patent: Mar. 19, 2019

(54) IMAGE PROCESSING APPARATUS, ELECTRONIC APPARATUS, DETECTION DEVICE, METHOD FOR CONTROLLING IMAGE PROCESSING APPARATUS, METHOD FOR CONTROLLING ELECTRONIC APPARATUS, AND METHOD FOR CONTROLLING DETECTION DEVICE

(71) Applicant: CANON KABUSHIKI KAISHA, Tokyo (JP)

(72) Inventor: Takeshi Aoyagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 407 days.

(21) Appl. No.: 14/092,841

(22) Filed: Nov. 27, 2013

(65) Prior Publication Data
US 2014/0157031 A1 Jun. 5, 2014

(30) Foreign Application Priority Data
Dec. 4, 2012 (JP) .................................. 2012-265616

(51) Int. Cl.
*G06F 1/32* (2006.01)
*G06F 1/3215* (2019.01)
(Continued)

(52) U.S. Cl.
CPC ............ *G06F 1/3215* (2013.01); *G06F 1/325* (2013.01); *G06F 1/3231* (2013.01);
(Continued)

(58) Field of Classification Search
CPC ... G06F 1/3231; G06F 3/04845; G06F 17/277
See application file for complete search history.

(56) References Cited

U.S. PATENT DOCUMENTS 5,567,942 A * 10/1996 Lee ..................... G08B 13/193
250/349
7,995,034 B2 * 8/2011 Pope ..................... G06F 1/3215
345/163
(Continued)

FOREIGN PATENT DOCUMENTS

JP H05-066863 A 3/1993
JP H09-033662 A 2/1997
(Continued)

*Primary Examiner* — Jaweed A Abbaszadeh
*Assistant Examiner* — Alyaa T Mazyad
(74) *Attorney, Agent, or Firm* — Canon U.S.A., Inc. IP Division

(57) ABSTRACT

An image processing apparatus that operates in a first power state or a second power state in which power consumption is smaller than in the first power state includes a detection unit that includes regions in which an object is detected, an analysis unit configured to analyze results of detection obtained in the plurality of regions, wherein the analysis unit enters a power saving mode in the second power state, a control unit that causes the analysis unit to return from the power saving state in a case where an object has been detected in any of the plurality of regions included in the detection unit in the second power state, and a power control unit that, in a case where the analysis unit determines that an object has approached the image processing apparatus, shifts the image processing apparatus from the second power state to the first power state.

12 Claims, 21 Drawing Sheets

(51) Int. Cl.
*G06F 1/3231* (2019.01)
*G06F 1/3234* (2019.01)
*G06F 3/042* (2006.01)

(52) U.S. Cl.
CPC .......... *G06F 3/0425* (2013.01); *G06F 3/0426* (2013.01); *Y02D 10/173* (2018.01); *Y02D 50/20* (2018.01)

(56) References Cited

U.S. PATENT DOCUMENTS

| | | | | |
|---|---|---|---|---|
| 2005/0071698 A1* | 3/2005 | Kangas | ................. | G06F 1/3203 713/300 |
| 2010/0079410 A1* | 4/2010 | Minton | ................... | G06F 3/016 345/175 |
| 2012/0127518 A1* | 5/2012 | Ogata | ................... | G06F 1/3231 358/1.15 |
| 2012/0287035 A1* | 11/2012 | Valko | ................... | G06F 1/3231 345/156 |
| 2013/0219198 A1* | 8/2013 | Kuroishi | ............ | H04N 1/00896 713/310 |
| 2014/0149754 A1* | 5/2014 | Silva | .................... | G06F 1/3212 713/300 |

FOREIGN PATENT DOCUMENTS

| | | |
|---|---|---|
| JP | H09-307672 A | 11/1997 |
| JP | 11202690 A | 7/1999 |
| JP | 2010-282134 A | 12/2010 |
| JP | 5083447 B2 | 11/2012 |

\* cited by examiner

FIG. 1A
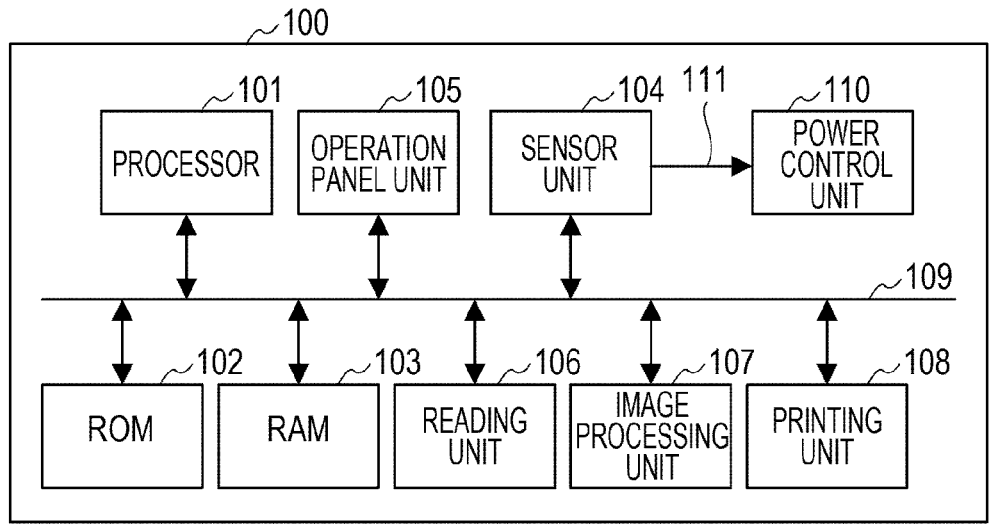
FIG. 1B
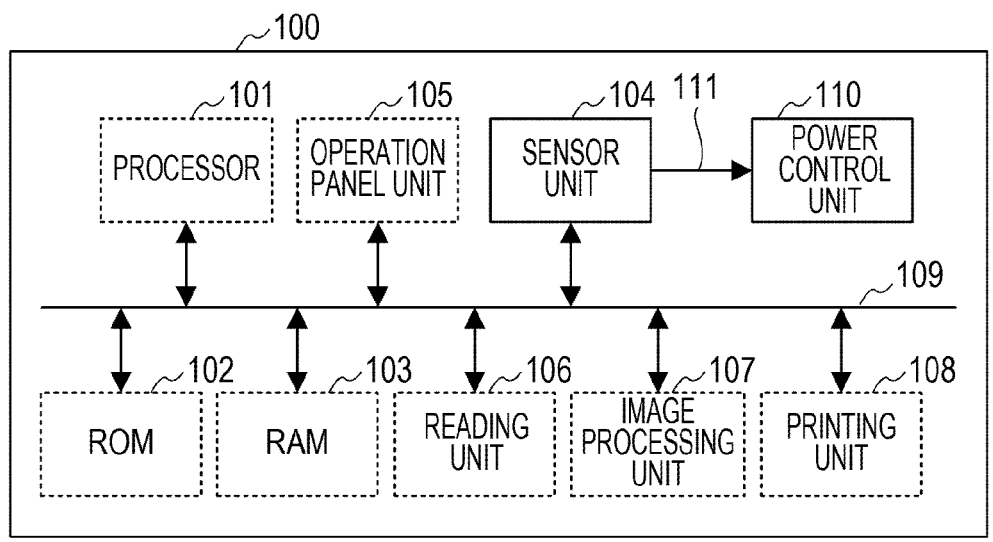
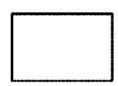 : COMPONENT TO WHICH POWER IS SUPPLIED
 : COMPONENT TO WHICH POWER IS NOT SUPPLIED

FIG. 4B

| PYROELECTRIC ARRAY REGION | CORRESPONDING GROUP | PYROELECTRIC ARRAY REGION | CORRESPONDING GROUP | PYROELECTRIC ARRAY REGION | CORRESPONDING GROUP |
|---|---|---|---|---|---|
| A1 | Grp[3] | B1 | Grp[3] | C1 | Grp[3] |
| A2 | Grp[4] | B2 | Grp[4] | C2 | Grp[4] |
| A3 | Grp[5] | B3 | Grp[5] | C3 | Grp[4] |
| A4 | Grp[6] | B4 | Grp[5] | C4 | Grp[4] |
| A5 | Grp[5] | B5 | Grp[5] | C5 | Grp[4] |
| A6 | Grp[4] | B6 | Grp[4] | C6 | Grp[4] |
| A7 | Grp[3] | B7 | Grp[3] | C7 | Grp[3] |

| PYROELECTRIC ARRAY REGION | CORRESPONDING GROUP | PYROELECTRIC ARRAY REGION | CORRESPONDING GROUP | PYROELECTRIC ARRAY REGION | CORRESPONDING GROUP |
|---|---|---|---|---|---|
| D1 | Grp[3] | E1 | Grp[2] | F1 | Grp[1] |
| D2 | Grp[3] | E2 | Grp[2] | F2 | Grp[1] |
| D3 | Grp[3] | E3 | Grp[2] | F3 | Grp[1] |
| D4 | Grp[3] | E4 | Grp[2] | F4 | Grp[1] |
| D5 | Grp[3] | E5 | Grp[2] | F5 | Grp[1] |
| D6 | Grp[3] | E6 | Grp[2] | F6 | Grp[1] |
| D7 | Grp[3] | E7 | Grp[2] | F7 | Grp[1] |

| PYROELECTRIC ARRAY REGION | CORRESPONDING GROUP |
|---|---|
| G1 | Grp[0] |
| G2 | Grp[0] |
| G3 | Grp[0] |
| G4 | Grp[0] |
| G5 | Grp[0] |
| G6 | Grp[0] |
| G7 | Grp[0] |

FIG. 5

| ORDER OF RECOGNITION | (1) | | (2) | | (3) | | (4) | |
|---|---|---|---|---|---|---|---|---|
| | PYROELECTRIC ARRAY REGION | CORRESPONDING GROUP | PYROELECTRIC ARRAY REGION | CORRESPONDING GROUP | PYROELECTRIC ARRAY REGION | CORRESPONDING GROUP | PYROELECTRIC ARRAY REGION | CORRESPONDING GROUP |
| DETECTION EXAMPLE 1 | C1 | Grp[3] | C2 | Grp[4] | B3 | Grp[5] | A4 | Grp[6] |
| DETECTION EXAMPLE 2 | E7 | Grp[2] | E6 | Grp[2] | D5 | Grp[3] | C4 | Grp[4] |
| DETECTION EXAMPLE 3 | C1 | Grp[3] | C2 | Grp[4] | D3 | Grp[3] | D4 | Grp[3] |
| DETECTION EXAMPLE 4 | A7 | Grp[3] | B7 | Grp[3] | C6 | Grp[4] | D6 | Grp[3] |

| ORDER OF RECOGNITION | (5) | | (6) | | (7) | |
|---|---|---|---|---|---|---|
| | PYROELECTRIC ARRAY REGION | CORRESPONDING GROUP | PYROELECTRIC ARRAY REGION | CORRESPONDING GROUP | PYROELECTRIC ARRAY REGION | CORRESPONDING GROUP |
| DETECTION EXAMPLE 1 | — | — | — | — | — | — |
| DETECTION EXAMPLE 2 | B4 | Grp[5] | A4 | Grp[6] | — | — |
| DETECTION EXAMPLE 3 | E5 | Grp[2] | F5 | Grp[1] | G6 | Grp[0] |
| DETECTION EXAMPLE 4 | E6 | Grp[2] | F5 | Grp[1] | G5 | Grp[0] |

FIG. 7
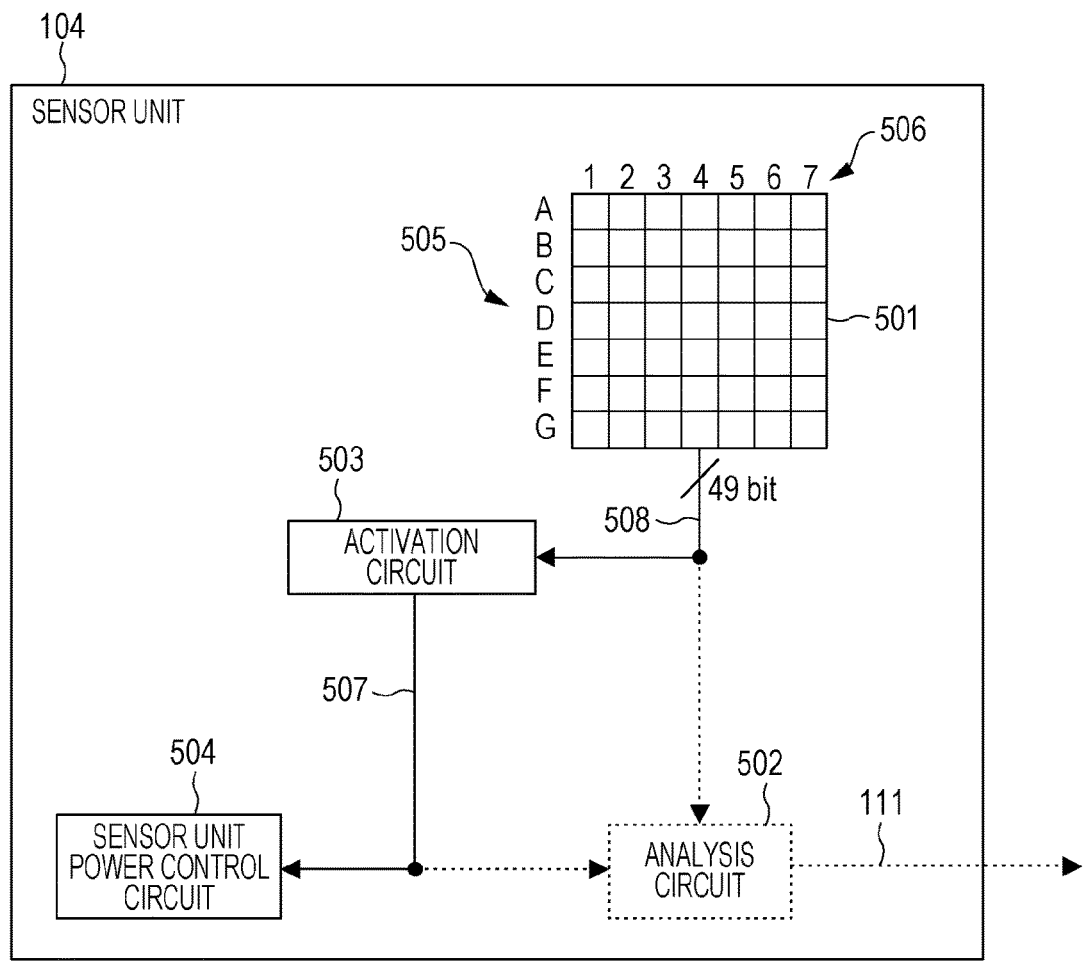
 : COMPONENT TO WHICH POWER IS SUPPLIED
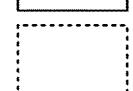 : COMPONENT TO WHICH POWER IS NOT SUPPLIED FIG. 12
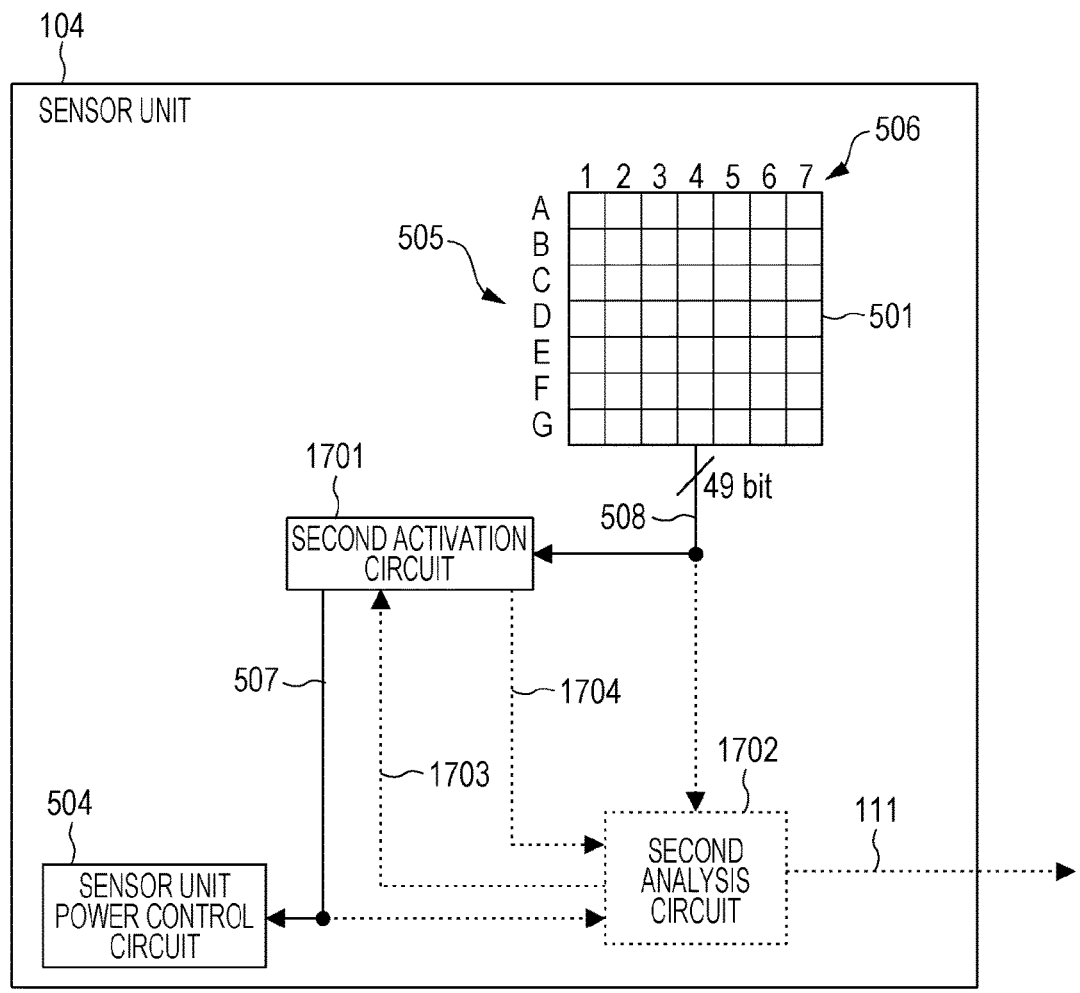
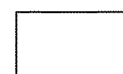 : COMPONENT TO WHICH POWER IS SUPPLIED
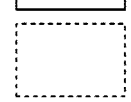 : COMPONENT TO WHICH POWER IS NOT SUPPLIED

IMAGE PROCESSING APPARATUS, ELECTRONIC APPARATUS, DETECTION DEVICE, METHOD FOR CONTROLLING IMAGE PROCESSING APPARATUS, METHOD FOR CONTROLLING ELECTRONIC APPARATUS, AND METHOD FOR CONTROLLING DETECTION DEVICE

BACKGROUND OF THE INVENTION

Field of the Invention

The present invention relates to a technique for control power using a sensor.

Description of the Related Art

Currently, some electronic apparatuses such as image processing apparatuses perform control while detecting presence of a user nearby using information from human detection sensors included therein.

In typical control, when an image processing apparatus has not only a normal operation mode but also a power saving mode, in which power consumption is reduced, the image processing apparatus recovers from the power saving mode to the normal operation mode if a user enters a detection range of the human detection sensor during the power saving mode (refer to Japanese Patent Laid-Open No. 11-202690).

In an image processing apparatus disclosed in Japanese Patent Laid-Open No. 11-202690, however, there is a problem in that the image processing apparatus might recover from the power saving state by erroneously detecting a person who does not use the image processing apparatus, such as a passerby, and accordingly power is unnecessarily consumed. This problem may be solved using a method for avoiding erroneous detection by decreasing detection sensitivity and narrowing the detection range of the human detection sensor.

In this case, however, a distance over which an actual operator approaching the image processing apparatus may be certainly detected becomes small and, because the image processing apparatus might still be recovering even when the operator has reached the image processing apparatus, the operator needs to wait for completion of the recovery, which decreases user-friendliness.

As a method for solving this problem, a method may be used in which an approaching operator is detected more accurately by detecting presence of a human in a plurality of regions using a plurality of sensors and analyzing the positions and the order of regions in which the approaching operator has been detected. Since movement of a human within the detection range may be recognized in this method, the movement of the human may be predicted, and the image processing apparatus may begin to recover from the power saving state by predicting that the human is approaching the image processing apparatus.

In this method, however, in order to recognize the state of movement of a human on the basis of detection information from the plurality of regions and predict the future movement direction of the human and the like on the basis of results of the recognition, a simple analysis circuit such as a microcomputer is necessary.

When the image processing apparatus is in the normal operation state, the power consumption of the analysis circuit in a pyroelectric array sensor is considerably smaller than that of a central processing unit (CPU) that controls the entirety of the image processing apparatus or the like.

When the image processing apparatus is in the power saving state, however, the power consumption of the entirety of the image processing apparatus is required to be extremely small, namely, for example, less than 1 W, and therefore the power consumption of the analysis circuit significantly affects the required power consumption.

Thus, it is very difficult to realize both further reduction of power consumption in the power saving state and rapid recovery from the power saving state at a high level.

SUMMARY OF THE INVENTION

The present invention aims to solve the above problem. The present invention provides, in an image processing apparatus that recovers from a power saving state by detecting an approaching object using a detection unit such as a pyroelectric array sensor, a mechanism for realizing both further reduction of power consumption in the power saving state and rapid recovery from the power saving state at a high level.

The present invention provides an image processing apparatus that operates in a first power state or a second power state in which power consumption is smaller than in the first power state includes a detection unit that includes regions in which an object is detected, an analysis unit configured to analyze results of detection obtained in the plurality of regions, wherein the analysis unit enters a power saving mode in the second power state, a control unit that causes the analysis unit to return from the power saving state in a case where an object has been detected in any of the plurality of regions included in the detection unit in the second power state, and a power control unit that, in a case where the analysis unit determines that an object has approached the image processing apparatus, shifts the image processing apparatus from the second power state to the first power state.

Further features of the present invention will become apparent from the following description of exemplary embodiments with reference to the attached drawings.

BRIEF DESCRIPTION OF THE DRAWINGS

FIGS. 1A and 1B are block diagrams illustrating an example of the configuration of an image processing apparatus, which is an electronic apparatus including a detection device according to a first embodiment of the present invention.

FIGS. 4A and 4B are diagrams illustrating region groups obtained by grouping pyroelectric cells of a pyroelectric array sensor according to the first embodiment.

FIG. 5 is a diagram illustrating examples of information regarding a transition pattern of a detected heat source according to the first embodiment of the present invention.

FIG. 7 is a diagram illustrating a power supply state at a time when the sensor unit according to the first embodiment of the present invention is in a standby state.

FIG. 12 is a diagram illustrating a power supply state at a time when the sensor unit according to the second embodiment of the present invention is in the standby state.

DESCRIPTION OF THE EMBODIMENTS

Figure 2A:
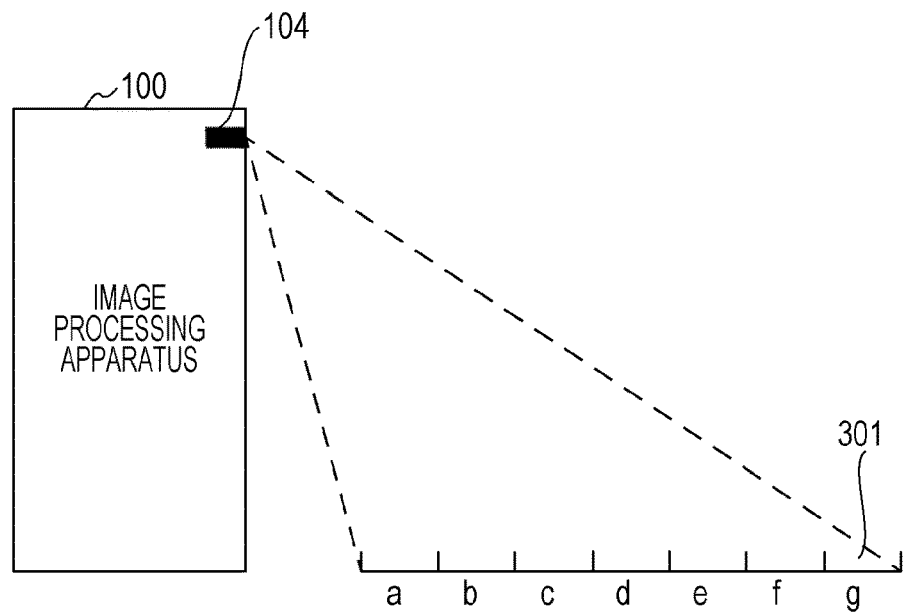
FIGS. 2A and 2B are diagrams illustrating a positional relationship between the image processing apparatus and a detection range of a sensor unit viewed from a side of the image processing apparatus.

Embodiments of the present invention will be described hereinafter with reference to the drawings. Although an image processing apparatus is used as an example of an electronic apparatus including a detection device in the present invention in the following embodiments, the present invention may be the detection device itself or may be another type of electronic apparatus.

First Embodiment

FIGS. 1A and 1B are block diagrams illustrating an example of the configuration of an image processing apparatus, which is an electronic apparatus including a detection device according to an embodiment of the present invention.

An image processing apparatus 100 is an embodiment of the present invention. The image processing apparatus 100 includes the following components. A processor 101 controls the entirety of the image processing apparatus 100. A read-only memory (ROM) 102 stores programs for the processor 101 and the like. A random-access memory (RAM) 103 is used when the processor 101 executes a program. The RAM 103 is also used for temporarily storing data that is being processed when the image processing apparatus 100 is performing one of various processes such as printing and copying.

A sensor unit 104 is a sensor unit that is typified by a pyroelectric array sensor and that is capable of detecting presence of an object on the basis of the amount of infrared radiation or the like. The object detected by the sensor unit 104 may be a stationary object or may be a moving object. Although the object detected by the sensor unit 104 is a human body (human) in this embodiment, the object detected by the sensor unit 104 is not limited to a human body (human). In this embodiment, the sensor unit 104 may detect presence of an object (hereinafter referred to as a heat source) such as a human body on the basis of the amount of infrared radiation or the like.

In addition, the sensor unit 104 may divide a detection range thereof into a plurality of regions and perform detection in each region. Furthermore, when the sensor unit 104 has detected a heat source around the image processing apparatus 100 and recognized that the heat source is approaching the image processing apparatus 100 with the image processing apparatus 100 in a power saving state, the sensor unit 104 outputs a system activation signal 111.

The sensor unit 104 may use an infrared line sensor, in which infrared sensors that detect infrared radiation are arranged in a line, or an infrared array sensor, in which infrared sensors are arranged in a matrix, instead of the pyroelectric array sensor.

An operation panel unit 105 enables a user to instruct the image processing apparatus 100 to perform an operation and displays a processing state of the image processing apparatus 100. A reading unit 106 generates data regarding an image of a document read by the image processing apparatus 100.

An image processing unit 107 receives the image data generated by the reading unit 106 through the RAM 103 and performs image processing on the image data. A printing unit 108 receives the image data subjected to the image processing performed by the image processing unit 107 through the RAM 103 and prints the image data on a paper medium or the like.

A bus 109 connects the processor 101, the ROM 102, the RAM 103, the sensor unit 104, the operation panel unit 105, the reading unit 106, the image processing unit 107, and the printing unit 108 to one another. A power control unit 110 supplies power necessary for the components, namely the processor 101, the ROM 102, the RAM 103, the sensor unit 104, the operation panel unit 105, the reading unit 106, the image processing unit 107, and the printing unit 108 (power control).

The power control unit 110 supplies power to each component in one of at least two states, namely a normal operation state (first power state) in which the image processing apparatus 100 is performing a normal operation such as copying or printing and a power saving state (second power state) in which the image processing apparatus 100 is not being used.

When the image processing apparatus 100 is in the normal operation state, the power control unit 110 supplies power to all the components. When the image processing apparatus 100 is in the power saving state, the power control unit 110 supplies power only to the power control unit 110 itself and the sensor unit 104 as illustrated in FIG. 1B. That is, in the power saving state, power is not supplied to components (101 to 103 and 105 to 108) indicated by broken lines in FIG. 1B.

Switching from the power saving state to the normal operation state is initiated by the system activation signal 111 output from the sensor unit 104 to the power control unit 110. When the sensor unit 104 has detected a heat source around the image processing apparatus 100 and recognized that the heat source is approaching the image processing apparatus 100 with the image processing apparatus 100 in the power saving state, the sensor unit 104 outputs the system activation signal 111 to the power control unit 110.

FIG. 2A is a diagram illustrating a positional relationship between the image processing apparatus 100 and the detection range of the sensor unit 104 in the present invention viewed from a side of the image processing apparatus 100. The same components as those illustrated in FIGS. 1A and 1B are given the same reference numerals.

FIG. 2A illustrates a detection range 301 of the sensor unit 104 directed forward and downward from the image processing apparatus 100.

Figure 2B:
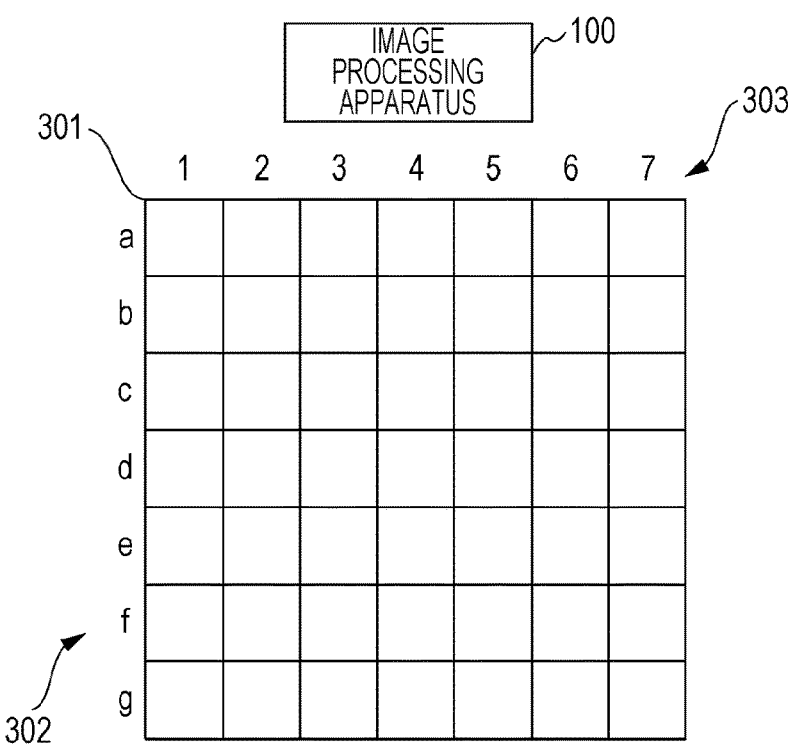

FIG. 2B is a diagram illustrating a positional relationship between the image processing apparatus 100 and the detection range 301 of the sensor unit 104 viewed from above the image processing apparatus 100. The same components as those illustrated in FIG. 2A are given the same reference numerals.

In this embodiment, the plurality of regions in which the sensor unit 104 may individually perform detection are indicated by 7×7 squares in the detection range 301 illustrated in FIG. 2B.

Names 302 of rows of the squares are used for describing the positions of the detection regions, and include a, b, c, d, e, f, and g in this order from a row closest to the image processing apparatus 100.

Names 303 of columns of the squares include 1, 2, 3, 4, 5, 6, and 7 in this order from a leftmost column in front of the image processing apparatus 100.

In this embodiment, the positions of the regions are described while, for example, denoting a leftmost region closest to the image processing apparatus 100 by a1 and a rightmost region closest to the image processing apparatus 100 by a7.

Figure 3:
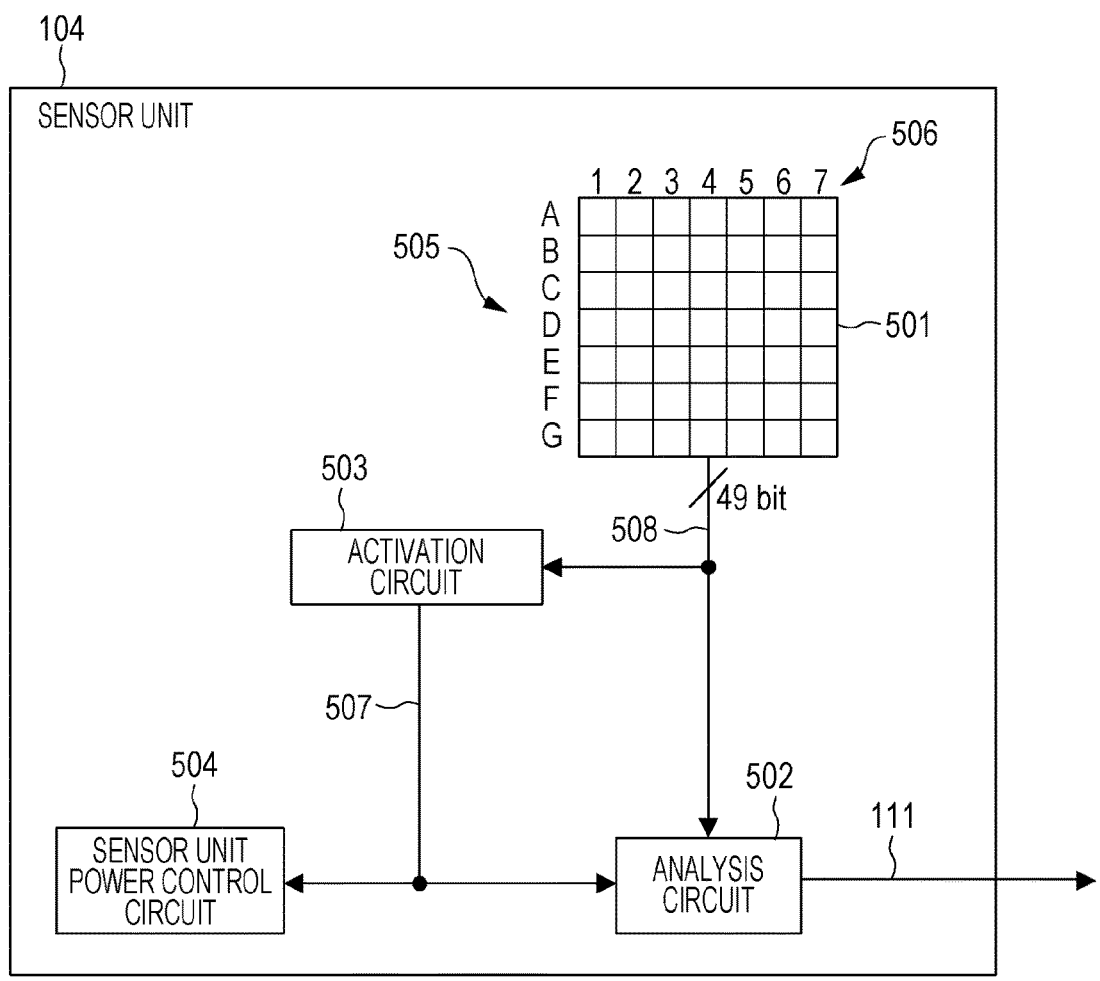
FIG. 3 is a block diagram illustrating an example of the internal configuration of the sensor unit according to the first embodiment.

FIG. 3 is a block diagram illustrating an example of the internal configuration of the sensor unit 104 according to the first embodiment.

In FIG. 3, a pyroelectric array sensor 501 is divided into 7×7 squares, each of which includes a pyroelectric cell. The pyroelectric array sensor 501 is obtained by arranging pyroelectric sensors in an N×N array (although a pyroelectric array sensor in which pyroelectric sensors are arranged in a 7×7 array is used in this embodiment, the present invention is not limited to this).

Names 505 of rows in the arrangement of the pyroelectric array sensor 501 include A, B, C, D, E, F, and G, which correspond to the names a, b, c, d, e, f, and g, respectively, of the squares for describing the positions of the detection regions illustrated in FIG. 2B.

Names 506 of columns in the arrangement of the pyroelectric array sensor 501 include 1, 2, 3, 4, 5, 6, and 7, which correspond to the names 1, 2, 3, 4, 5, 6, and 7, respectively, of the squares for describing the positions of the detection regions illustrated in FIG. 2B.

That is, when a heat source is present in the region a1 illustrated in FIG. 2B, the heat source is detected by a pyroelectric cell A1 illustrated in FIG. 3.

The pyroelectric array sensor 501 outputs positional information regarding regions in which a human has been detected in order of detection.

An analysis circuit 502 is a component that recognizes movement of a heat source detected by the pyroelectric array sensor 501 and that performs an analysis process such as prediction of movement using a small data processing circuit such as a microcomputer in this embodiment. The pyroelectric array sensor 501 and the analysis circuit 502 are connected to each other by a 49-bit signal line, and each bit transmits a detection signal of each of the pyroelectric cells A1 to G7. The analysis circuit 502 may adopt a configuration in which, for example, the analysis process is performed by reading a program stored in a ROM or a flash memory, which is not illustrated, and executing the program.

The pyroelectric array sensor 501 and the analysis circuit 502 are connected to each other by the 49-bit signal line, and each bit transmits a detection signal of each of the pyroelectric cells A1 to G7. In this embodiment, a pyroelectric cell that has detected a heat source transmits a signal of "high (1)" and a pyroelectric cell that has not detected a heat source transmits a signal of "low (0)". Bit 0 transmits a detection signal of the pyroelectric cell A1, and Bit 1 transmits a detection signal of the pyroelectric cell A2. Similarly, Bit 6 transmits a detection signal of the pyroelectric cell A7, Bit 7 transmits a detection signal of the pyroelectric cell B1, and Bit 48 transmits a detection signal of the pyroelectric cell G7.

Recognition of movement of a heat source by the pyroelectric array sensor 501 and the analysis circuit 502 will be described hereinafter in detail.

Figure 4A:
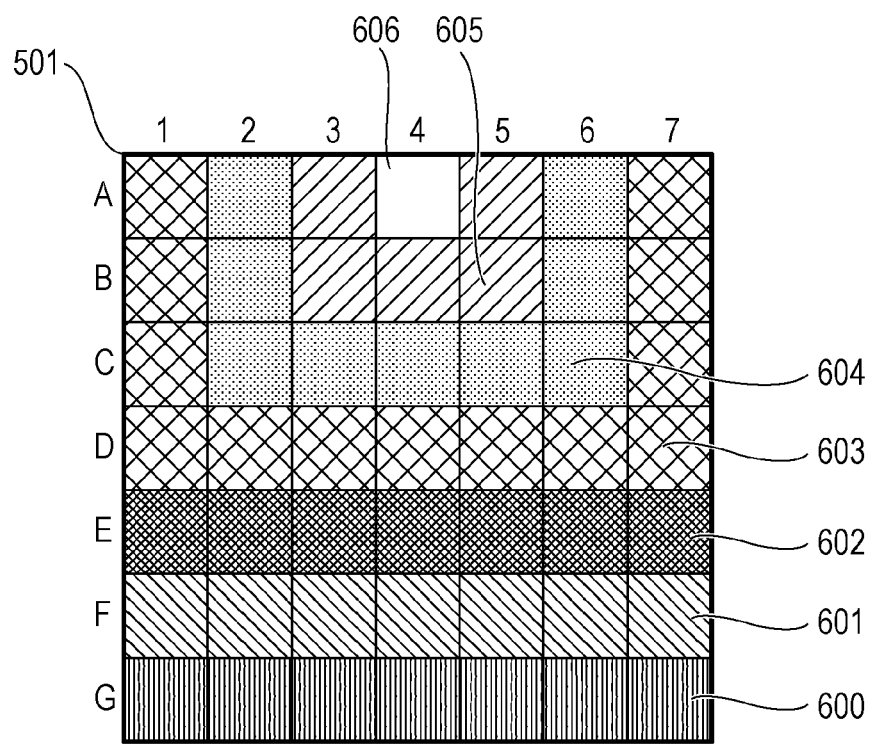

FIG. 4A is a diagram illustrating region groups obtained by grouping the pyroelectric cells of the pyroelectric array sensor 501 according to this embodiment.

In this embodiment, a plurality of region groups are set in a concentric manner while determining the region A4, which is the closest to the image processing apparatus 100, as the center.

In FIG. 4A, a region group 606 is referred to as Grp[6], a region group 605 is referred to as Grp[5], a region group 604 is referred to as Grp[4], a region group 603 is referred to as Grp[3], a region group 602 is referred to as Grp[2], a region group 601 is referred to as Grp[1], and a region group 600 is referred to as Grp[0]. That is, the pyroelectric cells of the pyroelectric array sensor 501 correspond to groups illustrated in FIG. 4B.

The image processing apparatus 100 according to this embodiment recognizes movement of a heat source, that is, whether a heat source is approaching or leaving the image processing apparatus 100, using such region groups. In this case, region groups is recognized in order of detection of detection signals of the pyroelectric cells, and if a region group number remains the same as that of a previously recognized region group or increases, it is recognized that a heat source is approaching, and if the region group number remains the same as that of a previously recognized region group or decreases, it is recognized that a heat source is leaving.

Some specific examples of the recognition of movement will be described hereinafter.

FIG. 5 is a diagram illustrating examples of information regarding a transition pattern of a detected heat source according to the first embodiment of the present invention.

FIGS. 6A to 6D are diagrams illustrating examples of movement of the heat source used for describing the first embodiment.

Figure 6A:
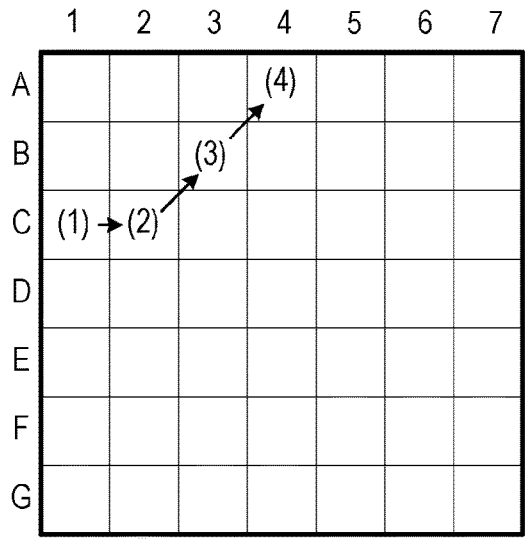
FIGS. 6A to 6D are diagrams illustrating examples of movement of the heat source used for describing the first embodiment.

In FIG. 6A, a case is assumed in which heat source detection signals of the pyroelectric cells have moved from (1) to (2), and then to (3) and (4).

In this case, as illustrated in detection example 1 in a table illustrated in FIG. 5, the pyroelectric cells C1, C2, B3, and A4 detect the heat source in this order. At this time, the region groups of these pyroelectric cells are Grp[3], Grp[4], Grp[5], and Grp[6], respectively, that is, the region group number continuously increases and reaches Grp[6], which is the region just in front of the image processing apparatus 100. Therefore, it is possible to recognize that the heat source has approached the image processing apparatus 100.

Figure 6B:
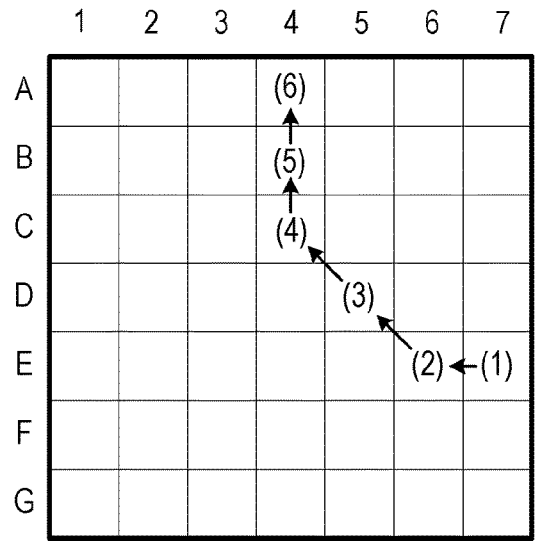

Next, in FIG. 6B, a case is assumed in which heat source detection signals of the pyroelectric cells have moved from (1) to (2), and then to (3), (4), (5), and (6).

In this case, as illustrated in detection example in the table illustrated in FIG. 5, the pyroelectric cells E7, E6, D5, C4, B4, and A4 detect the heat source in this order. At this time, the region groups of these pyroelectric cells are Grp[2], Grp[2], Grp[3], Grp[4], Grp[5], and Grp[6], respectively, that is, the region group number remains the same as a previously detected group number or increases and reaches Grp[6], which is the region just in front of the image processing apparatus 100. Therefore, it is possible to recognize that the heat source has approached the image processing apparatus 100.

Figure 6C:
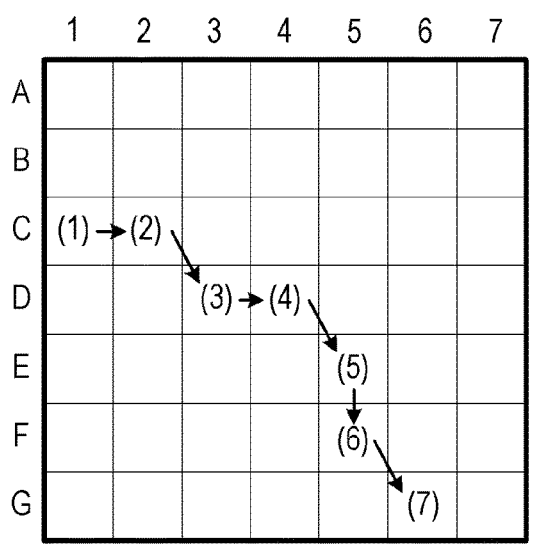

Next, in FIG. 6C, a case is assumed in which heat source detection signals of the pyroelectric cells have moved from (1) to (2), and then to (3), (4), (5), (6), and (7).

In this case, as illustrated in detection example in the table illustrated in FIG. 5, the pyroelectric cells C1, C2, D3, D4, E5, F5, and G6 detect the heat source in this order. At this time, the region groups of these pyroelectric cells are Grp[3], Grp[4], Grp[3], Grp[3], Grp[2], Grp[1], and Grp[0], respectively, that is, the region group number decreases from a previously detected group number and reaches Grp[0], which is the group located at the periphery of the pyroelectric array sensor. Therefore, it is possible to recognize that the heat source has left the image processing apparatus 100.

Figure 6D:
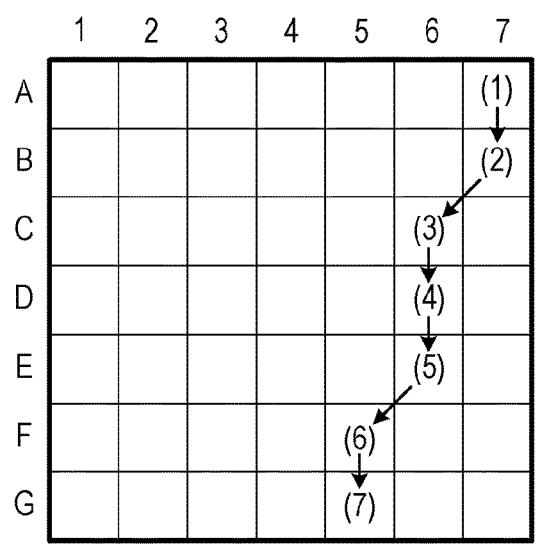

Next, in FIG. 6D, a case is assumed in which heat source detection signals of the pyroelectric cells have moved from (1) to (2), and then to (3), (4), (5), (6), and (7).

In this case, as illustrated in detection example in the table illustrated in FIG. 5, the pyroelectric cells A7, B7, C6, D6, E6, F5, and G5 detect the heat source in this order. At this time, the region groups of these pyroelectric cells are Grp[3], Grp[3], Grp[4], Grp[3], Grp[2], Grp[1], and Grp[0], respectively, that is, the region group number remains the same as a previously detected group number or decreases and reaches Grp[0], which is the group located at the periphery of the pyroelectric array sensor. Therefore, it is possible to recognize that the heat source has left the image processing apparatus 100.

As described above, the analysis circuit 502 recognizes movement of a heat source on the basis of detection signals of the pyroelectric array sensor 501.

When the image processing apparatus 100 is to recover from the power saving state to the normal operation state, a method may be used in which power begins to be supplied to all the components of the image processing apparatus 100 when a heat source has approached the image processing apparatus 100 and reached Grp[6], which is the region just in front of the image processing apparatus 100.

However, the image processing apparatus 100 does not become available immediately after power begins to be supplied, and it takes some time to activate the processor 101 and display user interfaces (UIs). Therefore, when a heat source has approached the image processing apparatus 100, the image processing apparatus 100 needs to recover from the power saving state to the normal operation state before the heat source reaches Grp[6], which is the region just in front of the image processing apparatus 100, by predicting that the heat source will reach Grp[6].

In this case, for example, when the heat source has approached the image processing apparatus 100 while increasing the region group number and reached Grp[5], it is predicted that the heat source will reach Grp[6], and the image processing apparatus 100 is recovered from the power saving state to the normal operation state.

As described above, when movement of a heat source is recognized and predicted in order to switch the image processing apparatus 100 from the power saving state to the normal operation state, the pyroelectric array sensor 501 and the analysis circuit 502 need to be used.

Recently, however, regulations on power consumption in the power saving state have become strict and a power consumption of as small as 1 W or 0.5 W or less is required as desirable power consumption of the entirety of the image processing apparatus 100 in the power saving state.

As described above, power is supplied only to the power control unit 110 and the sensor unit 104 in the image processing apparatus 100 in the power saving state, but even under this condition, power consumption is too large relative to the desirable power consumption of the entirety of the image processing apparatus 100.

In particular, whereas the pyroelectric array sensor 501 in the sensor unit 104 consumes little power, the analysis circuit 502 needs to have a certain size and processing capacity for recognizing and predicting movement of a heat source, which consumes power. Therefore, when the image processing apparatus 100 is in the power saving state, the sensor unit 104 also needs to be in the power saving state (hereinafter referred to as a standby state).

For this reason, in this embodiment, the sensor unit 104 includes an activation circuit 503 and a sensor unit power control circuit 504 as illustrated in FIG. 3, and two operation states, namely a "movement analysis state" and the "standby state", are provided for the sensor unit 104.

In the "movement analysis state", the sensor unit power control circuit 504 receives power supplied from the power control unit 110 in the image processing apparatus 100 and supplies power to all the components of the sensor unit 104, and the analysis circuit 502 performs processes for recognizing and predicting movement of a heat source (sensor unit power control).

In the "standby state", the sensor unit power control circuit 504 receives power supplied from the power control unit 110 in the image processing apparatus 100 and, as illustrated in FIG. 7, supplies (feeds) power to the pyroelectric array sensor 501 and the activation circuit 503, but does not supply power to the analysis circuit 502.

FIG. 7 is a diagram illustrating a power supply state at a time when the sensor unit 104 according to the first embodiment of the present invention is in the standby state.

Switching of the sensor unit 104 from the "standby state" to the "movement analysis state" is controlled by the activation circuit 503. Details will be described hereinafter.

The pyroelectric array sensor 501 and the activation circuit 503 are connected to each other by a 49-bit signal line, and each bit transmits a detection signal of each of the pyroelectric cells A1 to G7. Bit 0 transmits a detection signal of the pyroelectric cell A1, and Bit 1 transmits a detection signal of the pyroelectric cell A2. Similarly, Bit 6 transmits a detection signal of the pyroelectric cell A7, Bit 7 transmits a detection signal of the pyroelectric cell B1, and Bit 48 transmits a detection signal of the pyroelectric cell G7.

When any of the pyroelectric cells of the pyroelectric array sensor 501 has detected a heat source, the activation circuit 503 outputs an analysis circuit activation signal 507. In this case, when any of the pyroelectric cells has detected a heat source, the activation circuit 503 outputs "high (1)" as the analysis circuit activation signal 507, and when none of the pyroelectric cells has detected a heat source, the activation circuit 503 outputs "low (0)".

The analysis circuit activation signal 507 is transmitted to the analysis circuit 502 and the sensor unit power control circuit 504.

Upon receiving "high (1)" as the analysis circuit activation signal 507, the sensor unit power control circuit 504 supplies power to the analysis circuit 502. Upon receiving "high (1)" as the analysis circuit activation signal 507 and being is activated by power supplied from the sensor unit power control circuit 504, the analysis circuit 502 receives detection signals from the pyroelectric array sensor 501 and performs processes for analyzing and predicting movement of a heat source.

Figure 8:
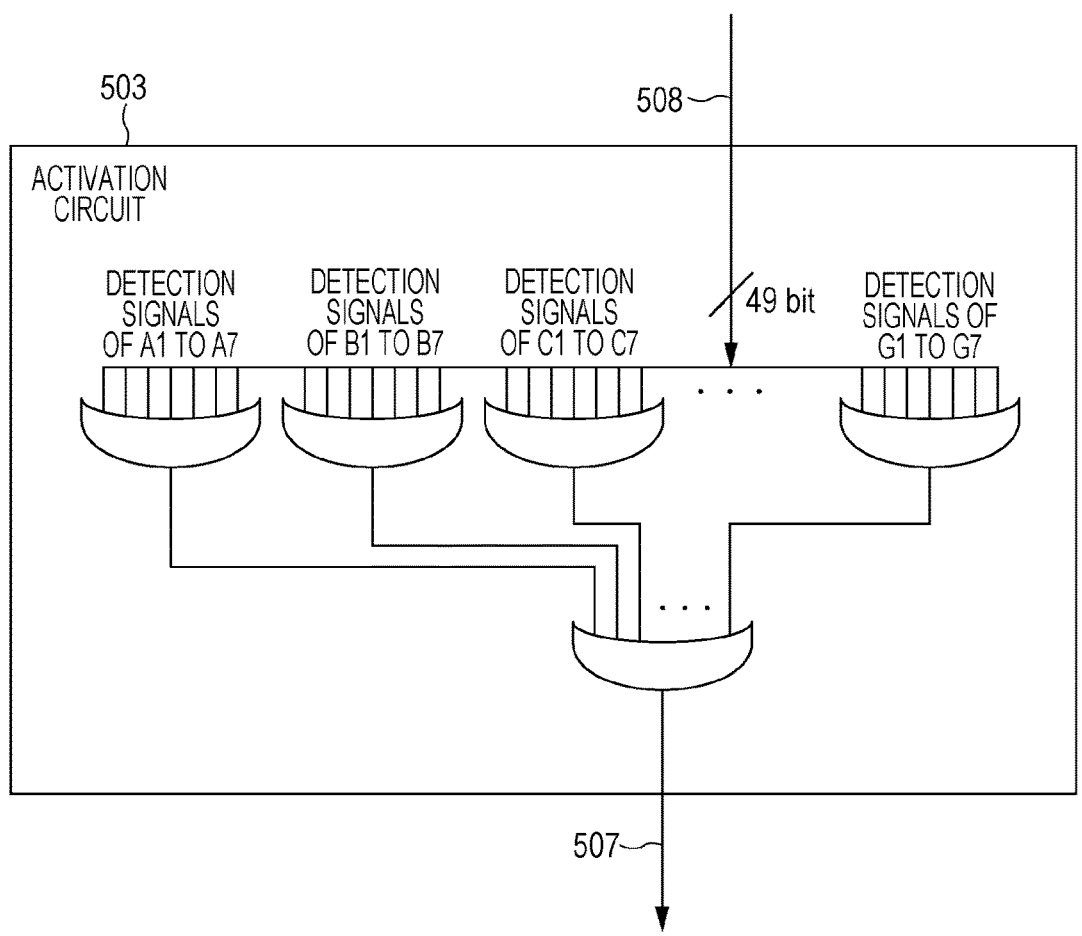
FIG. 8 is a diagram illustrating an example of the configuration of an activation circuit in the sensor unit according to the first embodiment of the present invention.

The activation circuit 503 has a configuration illustrated in FIG. 8, and all bits of a 49-bit heat source detection signal 508 are logically ORed and output as the analysis circuit activation signal 507.

FIG. 8 is a diagram illustrating an example of the configuration of the activation circuit 503 in the sensor unit 104 according to the first embodiment of the present invention.

By adopting the configuration illustrated in FIG. 8, "low (0)" is output when none of the pyroelectric cells A1 to G7 has detected a heat source, and when any of the pyroelectric cells A1 to G7 has detected a heat source, "high (1)" is output as the analysis circuit activation signal 507.

An operation for switching the image processing apparatus 100 including the sensor unit 104 having the above-described configuration from the power saving state to the normal operation state will be described with reference to FIG. 9.

Figure 9:
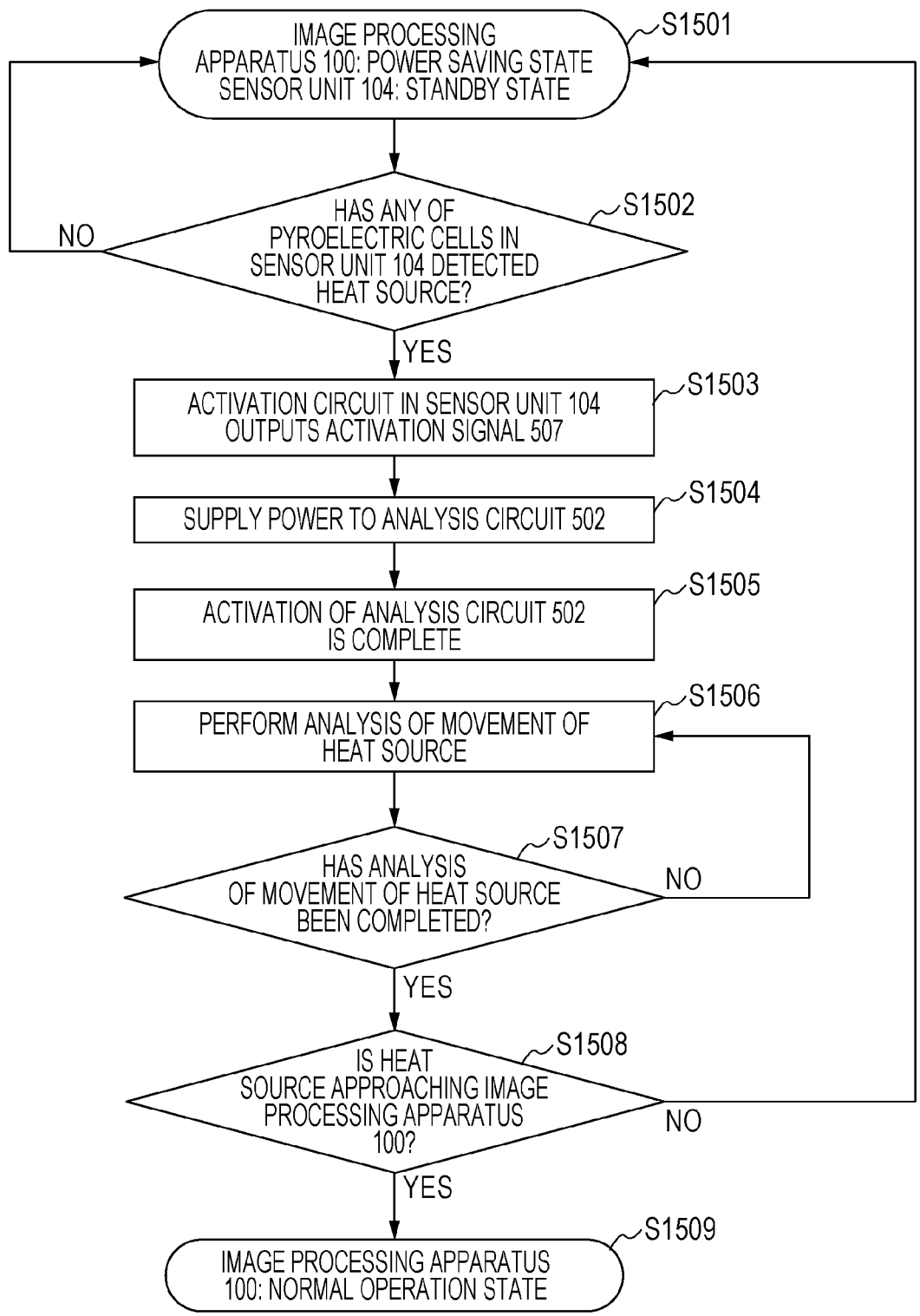
FIG. 9 is a flowchart illustrating an example of an operation for switching the image processing apparatus from a power saving state to a normal operation state according to the first embodiment of the present invention.

FIG. 9 is a flowchart illustrating an example of the operation for switching the image processing apparatus 100 from the power saving state to the normal operation state according to the first embodiment of the present invention. In FIGS. 9, S1501 and S1509 indicate the power saving state and the normal operation state, respectively, of the image processing apparatus 100. S1502 to S1508 indicate steps.

S1501 indicates the power saving state of the image processing apparatus 100. At this time, the sensor unit 104 is in the standby state, in which power is not supplied to the analysis circuit 502.

When the pyroelectric cells of the pyroelectric array sensor 501 in the sensor unit 104 have not detected a heat source (NO in S1502) with the image processing apparatus 100 in the power saving state (S1501), the image processing apparatus 100 remains in the power saving state (S1501).

When any of the pyroelectric cells of the pyroelectric array sensor 501 in the sensor unit 104 has detected a heat source (YES in S1502) with the image processing apparatus 100 in the power saving state (S1501), the activation circuit 503 in the sensor unit 104 outputs the analysis circuit activation signal 507 (S1503).

Upon receiving the analysis circuit activation signal 507 output from the activation circuit 503, the sensor unit power control circuit 504 begins to supply power to the analysis circuit 502 (S1504).

Furthermore, upon receiving power supplied from the sensor unit power control circuit 504 and the analysis circuit activation signal 507 output from the activation circuit 503 in the sensor unit 104, the analysis circuit 502 completes activation thereof (S1505) and enters the movement analysis state.

Thereafter, the analysis circuit 502 receives the heat source detection signal 508 from the pyroelectric array sensor 501, and executes an analysis of movement of the heat source (S1506).

When the analysis circuit 502 has not completed the analysis of the movement of the heat source (NO in S1507), the analysis circuit 502 keeps performing the analysis of the movement of the heat source on the basis of information from the pyroelectric array sensor 501 (S1506).

When the analysis circuit 502 has completed the analysis of the movement of the heat source (YES in step S1507), the analysis circuit 502 causes the process to proceed to S1508.

In S1508, the analysis circuit 502 determines whether or not the heat source is approaching the image processing apparatus 100 on the basis of a result of the analysis.

If the analysis circuit 502 determines that the heat source is approaching the image processing apparatus 100 (YES in S1508), the analysis circuit 502 outputs the system activation signal 111 to the power control unit 110 in the image processing apparatus 100. Upon receiving the system activation signal 111 output from the analysis circuit 502 in the sensor unit 104, the power control unit 110 supplies power to all the components of the image processing apparatus 100 to recover the image processing apparatus 100 from the power saving state to the normal operation state (S1509).

On the other hand, if the analysis circuit 502 determines as a result of the analysis that the heat source is leaving the image processing apparatus 100 (NO in S1508), the analysis circuit 502 does not output the system activation signal 111. That is, the image processing apparatus 100 remains in the power saving state, and in the sensor unit 104, the supply of power to the analysis circuit 502 is stopped and the sensor unit 104 is switched to the standby state (S1501).

As described above, in the first embodiment, when the image processing apparatus 100 is in the power saving state, the power consumption of the image processing apparatus 100 in the power saving state may be further reduced by causing the sensor unit 104 to be in the standby state, in which power is not supplied to the analysis circuit 502 in the sensor unit 104.

That is, in the image processing apparatus 100 that recovers from the power saving state using the pyroelectric array sensor 501, the power consumption of the image processing apparatus 100 in the power saving state may be reduced by suppressing power consumed by the microcomputer for analyzing results of detection performed by the pyroelectric array sensor 501 in the power saving state.

In addition, when any of the pyroelectric cells of the pyroelectric array sensor 501 has detected the heat source with the image processing apparatus 100 in the power saving state and the sensor unit 104 in the standby state, supply of power to the analysis circuit 502 in the sensor unit 104 begins and an analysis of a heat source is performed. Therefore, if the analysis circuit 502 determines that the heat source is approaching the image processing apparatus 100, the image processing apparatus 100 may recover from the power saving state to the normal operation state.

Thus, reduction of the power consumption of the sensor unit 104 in the power saving state and rapid recovery of the image processing apparatus 100 to the normal operation state when the sensor unit 104 has detected that a human is approaching may be realized at a high level.

That is, in this embodiment, reduction of power consumption in the power saving state and an analysis of movement of a heat source may both be realized at a high level using the above-described configuration.

Second Embodiment

In the first embodiment, an example of configuration has been described in which, when any of the pyroelectric cells of the pyroelectric array sensor 501 has detected a heat source and, by beginning supply of power to the analysis circuit 502 in the sensor unit 104 and performing an analysis of the heat source using the analysis circuit 502, the analysis circuit 502 has determined that the heat source is approaching the image processing apparatus 100 with the image processing apparatus 100 in the power saving state and the sensor unit 104 in the standby state, the image processing apparatus 100 may recover from the power saving state to the normal operation state.

In the first embodiment, however, for example, if it takes time to activate the analysis circuit 502 to establish the movement analysis state, if the range in which the pyroelectric cells detect a heat source is small, or if the movement speed of a heat source is high, not the entirety of a movement path of the heat source might be used in an analysis because the heat source moves before the analysis circuit 502 is activated and the analysis begins after any of the pyroelectric cells of the pyroelectric array sensor 501 detects the heat source. This will be described hereinafter with reference to FIG. 10 and the like.

Figure 10:
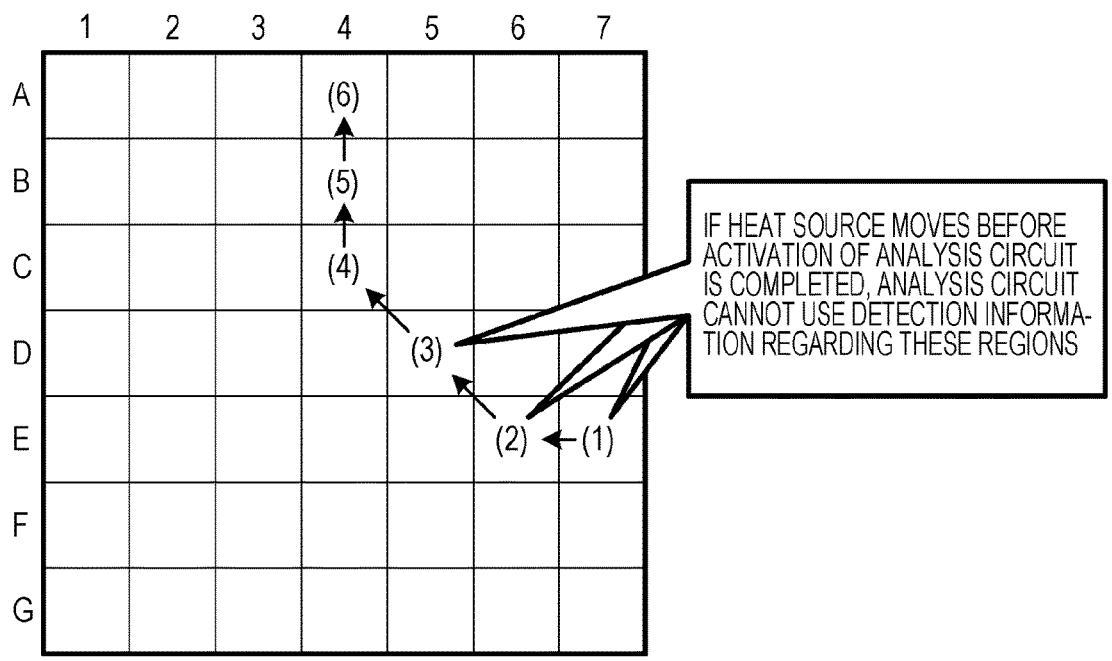
FIG. 10 is a diagram illustrating an example of movement of a heat source.

FIG. 10 is a diagram illustrating an example of movement of a heat source.

As illustrated in FIG. 10, for example, assume that a heat source has moved from (1) to (2), and then to (3), (4), (5), and (6). In this case, the pyroelectric cells E7, E6, D5, C4, B4, and A4 detect the heat source in this order.

If the sensor unit 104 is not in the standby state, as described in the first embodiment, the analysis circuit 502 performs an analysis of the movement of the heat source on the basis of information regarding the detected heat source from all the pyroelectric cells E7, E6, D5, C4, B4, and A4.

In addition, if the movement of the heat source is to be predicted, it is possible, when the movement of the heat source from (1) to (4) has been recognized, to predict that the heat source is approaching the image processing apparatus 100. Therefore, switching from the power saving state to the normal operation state may begin at an early time point.

If the sensor unit 104 is in the standby state, however, the activation circuit 503 outputs the analysis circuit activation signal 507 and the analysis circuit 502 is supplied with power and activated when the heat source has been detected by the pyroelectric cell E7.

If the time taken for the analysis circuit 502 to be activated to establish the movement analysis state is short, if the range in which the pyroelectric cells detect the heat source is large, or if the movement speed of the heat source is low, the heat source remains in the range of the pyroelectric cell E7 until the analysis circuit 502 is activated and begins to analyze the heat source, that is, until the activation is completed. In this case, the analysis circuit 502 may analyze the movement of the heat source on the basis of information from all the pyroelectric cells E7, E6, D5, C4, B4, and A4.

However, if it takes time to activate the analysis circuit 502 to establish the analysis state, if the range in which the pyroelectric cells detect the heat source small, or if the movement speed of the heat source is high, the heat source undesirably moves before the analysis circuit 502 is activated and begins to analyze the heat source.

For example, if the heat source has moved to the pyroelectric cell C4, the analysis circuit 502 cannot receive heat source detection signals of (1), (2), and (3) and, accordingly, cannot use information regarding the detected heat source from the pyroelectric cells E7, E6, and D5. Therefore, for example, a problem that a determination as to whether the heat source is approaching or leaving is made too late, that a result of the analysis is incorrectly determined, or that it takes time to complete the analysis might occur. In particular, the movement of the heat source might not be predicted only on the basis of information regarding the detected heat source from the pyroelectric cells (4), (5), and (6), and accordingly it might be difficult to switch from the power saving state to the normal operation state at an early time point.

Therefore, in a second embodiment, by including a storage circuit in the activation circuit 503, a pyroelectric cell that has detected a heat source is stored when the activation circuit 503 has output the analysis circuit activation signal 507, and this information is input to the analysis circuit 502 that has been supplied with power to perform an analysis. By adopting such a configuration, the time taken to make a determination as to whether a heat source is approaching or leaving may be reduced and the accuracy of the prediction of the movement of a heat source may be improved.

Details of the second embodiment will be described hereinafter.

The configuration, the power saving state, and the normal operation state of the image processing apparatus 100 according to the second embodiment are the same as those according to the first embodiment, and accordingly detailed description thereof is omitted here.

One of the characteristics of the second embodiment is the configuration of a sensor unit 104.

Figure 11:
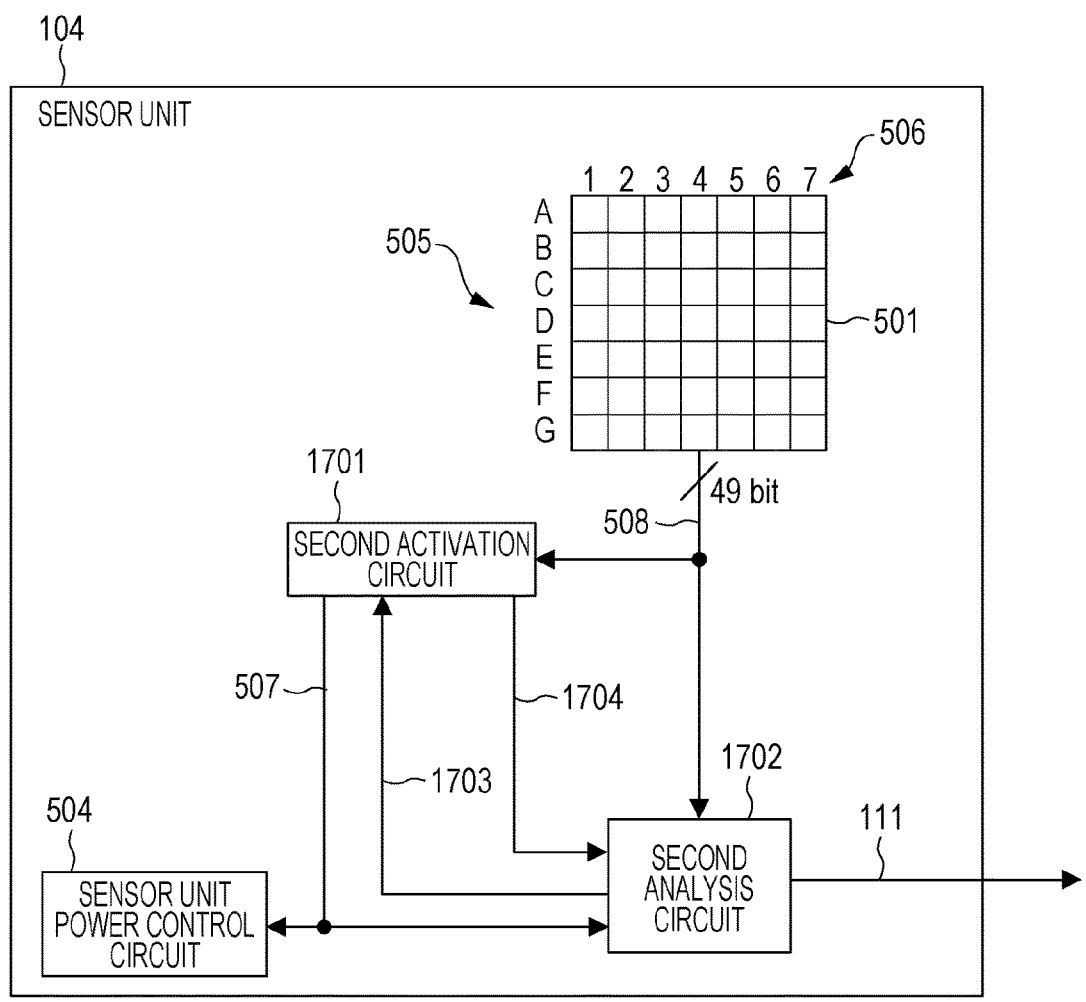
FIG. 11 is a diagram illustrating an example of the internal configuration of a sensor unit according to a second embodiment.

FIG. 11 is a diagram illustrating an example of the internal configuration of the sensor unit 104 according to the second embodiment. The same components as those according to the first embodiment are given the same reference numerals as those used in FIG. 3 to describe the first embodiment, and accordingly detailed description thereof is omitted here.

A second analysis circuit 1702 is a component that recognizes and predicts movement of a heat source detected by the pyroelectric array sensor 501 using a small data processing circuit such as a microcomputer in this embodiment. Supply of power to the second analysis circuit 1702 is controlled by the sensor unit power control circuit 504 as in the first embodiment.

In addition, the second analysis circuit 1702 outputs an activation completion signal 1703 when the second analysis circuit 1702 has switched from a state in which power is not supplied thereto to a state in which power is supplied thereto and has become capable of analyzing movement of a heat source after the activation thereof is completed.

As the activation completion signal 1703, "low (0)" is output when the activation of the second analysis circuit 1702 has not been completed, and "high (1)" is output when the activation of the second analysis circuit 1702 has been completed.

In addition, the second analysis circuit 1702 receives heat source detection history information 1704 from a second activation circuit 1701, and uses the heat source detection history information 1704 to analyze movement of a heat source. The heat source detection history information 1704 will be described in detail later.

The pyroelectric array sensor 501 and the second analysis circuit 1702 are connected to each other by a 49-bit signal line, and each bit transmits a detection signal of each of the pyroelectric cells A1 to G7.

In this embodiment, a pyroelectric cell that has detected a heat source transmits a signal of "high (1)", and a pyroelectric cell that has not detected a heat source transmits a signal of "low (0)". Bit 0 transmits a detection signal of the pyroelectric cell A1, and Bit 1 transmits a detection signal of the pyroelectric cell A2. Similarly, Bit 48 transmits a signal of the pyroelectric cell G7.

Recognition of movement of a heat source by the pyroelectric array sensor 501 and the second analysis circuit 1702 is the same as that according to the first embodiment, and accordingly detailed description thereof is omitted here.

In the second embodiment, as in the first embodiment, the sensor unit 104 includes the second activation circuit 1701 and the sensor unit power control circuit 504 as illustrated in FIG. 11, and the two operation states, namely the movement analysis state and the standby state, are provided for the sensor unit 104.

In the movement analysis state, the sensor unit power control circuit 504 receives power supplied from the power control unit 110 in the image processing apparatus 100, supplies power to all the components of the sensor unit 104, and performs processes for recognizing and predicting movement of a heat source using the second analysis circuit 1702.

In the standby state, the sensor unit power control circuit 504 receives power supplied from the power control unit 110 in the image processing apparatus 100, and, as illustrated in FIG. 12, supplies power to the pyroelectric array sensor 501 and the second activation circuit 1701 in the sensor unit 104, but does not supply power to the second analysis circuit 1702.

FIG. 12 is a diagram illustrating a power supply state at a time when the sensor unit 104 according to the second embodiment of the present invention is in the standby state.

Switching of the sensor unit 104 from the standby state to the movement analysis state is controlled by the second activation circuit 1701. Details will be described hereinafter.

The pyroelectric array sensor 501 and the second activation circuit 1701 are connected to each other by a 49-bit signal line, and each bit transmits a detection signal of each of the pyroelectric cells A1 to G7. Bit 0 transmits a detection signal of the pyroelectric cell A1, and Bit 1 transmits a detection signal of the pyroelectric cell A2. Similarly, Bit 48 transmits a signal of the pyroelectric cell G7.

When any of the pyroelectric cells of the pyroelectric array sensor 501 has detected a heat source, the second activation circuit 1701 outputs the analysis circuit activation signal 507. In this case, when any of the pyroelectric cells has detected a heat source, the second activation circuit 1701 outputs "1" as the analysis circuit activation signal 507, and when none of the pyroelectric cells has detected a heat source, the second activation circuit 1701 outputs "low (0)".

The analysis circuit activation signal 507 is transmitted to the second analysis circuit 1702 and the sensor unit power control circuit 504. Upon receiving "high (1)" as the analysis circuit activation signal 507, the sensor unit power control circuit 504 begins to supply power to the second analysis circuit 1702. In addition, upon receiving "high (1)" as the analysis circuit activation signal 507, the second analysis circuit 1702 receives detection signals from the pyroelectric array sensor 501 and performs processes for analyzing and predicting movement of a heat source.

Figure 13:
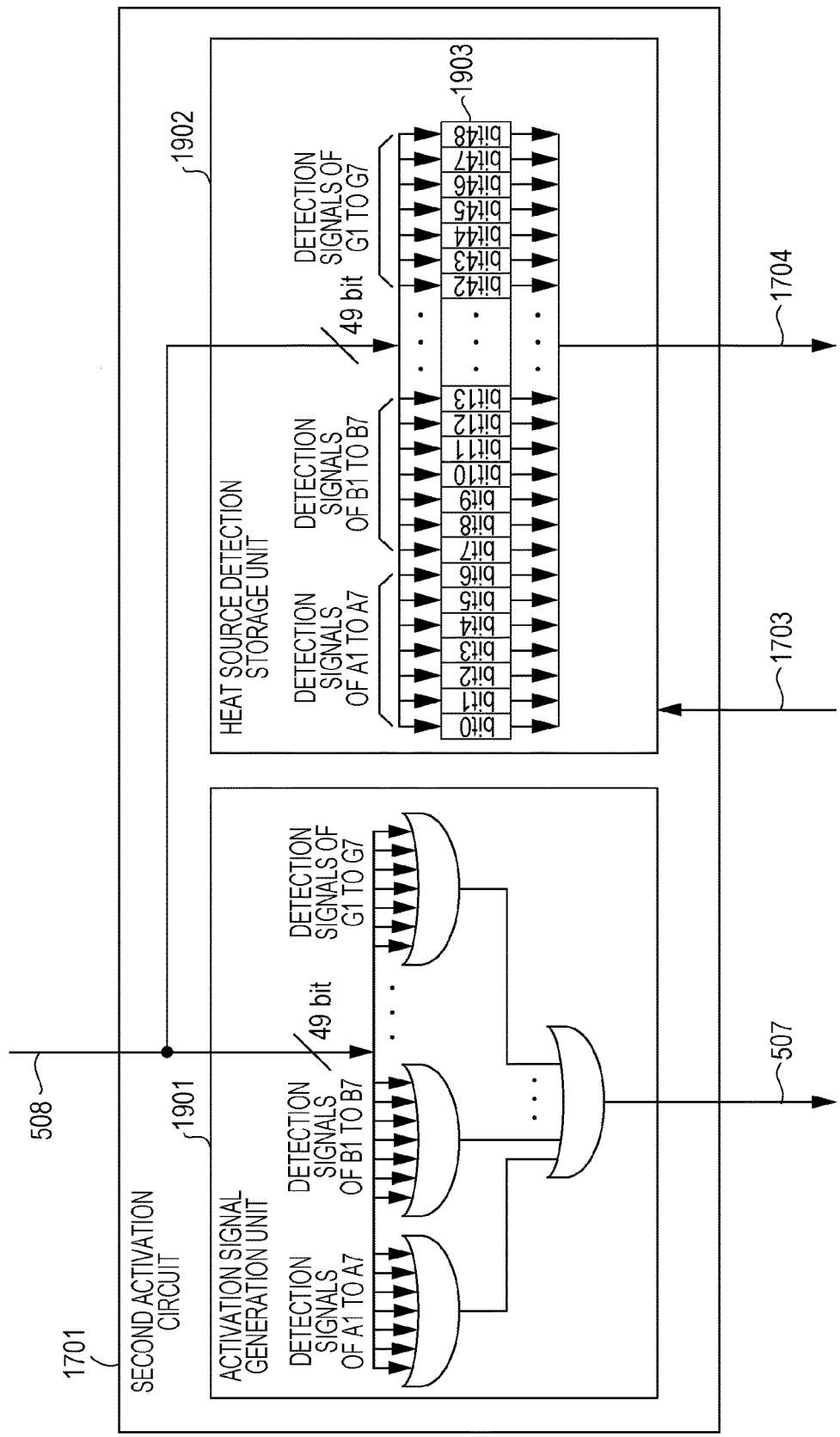
FIG. 13 is a diagram illustrating an example of the configuration of a second activation circuit in the sensor unit according to the second embodiment of the present invention.

As illustrated in FIG. 13, the second activation circuit 1701 has a configuration in which an activation signal generation unit 1901 and a heat source detection storage unit 1902.

FIG. 13 is a diagram illustrating an example of the configuration of the second activation circuit 1701 in the sensor unit 104 according to the second embodiment of the present invention.

As illustrated in FIG. 13, the activation signal generation unit 1901 has a configuration in which all the bits of the 49-bit heat source detection signal 508 are logically ORed and (all logical sums of the 49-bit heat source detection signal 508 are) output as the analysis circuit activation signal 507.

By adopting such a configuration, "low (0)" is output when none of the pyroelectric cells A1 to G7 has detected a heat source, and "high (1)" is output as the analysis circuit activation signal 507 when any of the pyroelectric cells A1 to G7 has detected a heat source.

The heat source detection storage unit 1902 includes a register unit 1903 having a bit width of 49 bits and capable of reading and writing, and all the bits of the 49-bit heat source detection signal 508 are transmitted to the bits of the register unit 1903, respectively.

When any of the pyroelectric cells of the pyroelectric array sensor 501 has detected a heat source with the sensor unit 104 in the standby state, the register unit 1903 stores the pyroelectric cell that has detected the heat source.

In the register unit 1903, the pyroelectric cells A1, A2, and A3 and the subsequent pyroelectric cells are sequentially assigned to Bit 0, Bit 1, Bit 2, and the like, respectively, in this embodiment. Similarly, the pyroelectric cell G7 is assigned to Bit 48. In a default state, all the bits are set to "0". That is, when the pyroelectric cell A1 of the pyroelectric array sensor 501 has detected a heat source first with the sensor unit 104 in the standby state, the register unit 1903 stores "1" in Bit 0. In addition, when the pyroelectric cell G2 of the pyroelectric array sensor 501 has detected a heat source first with the sensor unit 104 in the standby state, the register unit 1903 stores "1" in Bit 43.

After the analysis circuit activation signal 507 is output, the sensor unit power control circuit 504 supplies power to the second analysis circuit 1702, and when the activation of the second analysis circuit 1702 has been completed and the activation completion signal 1703 output from the second analysis circuit 1702 has become "high (1)", the register unit 1903 outputs a 49-bit signal to the second analysis circuit 1702 as the heat source detection history information 1704.

The second analysis circuit 1702 receives the heat source detection history information 1704 from the second activation circuit 1701, and uses the heat source detection history information 1704 to analyze movement of a heat source. Details will be described hereinafter.

First, as has been described with reference to FIG. 10, assume that detection signals of the pyroelectric cells have moved from (1) to (2), and then to (3), (4), (5), and (6).

In this case, the pyroelectric cells E7, E6, D5, C4, B4, and A4 detect a heat source in this order. When the sensor unit 104 is in the standby state, however, the heat source moves to the pyroelectric cell C4 before the second analysis circuit 1702 begins to analyze the heat source. In this case, it is difficult for the analysis circuit 502 to use detection information from the pyroelectric cells E7, E6, and D5 in the configuration according to the first embodiment.

Therefore, in the second embodiment, the second analysis circuit 1702 outputs the activation completion signal 1703 to the second activation circuit 1701 when the activation thereof has been completed, and receives the heat source detection history information 1704.

In this case, information regarding "E7", which is information regarding a position at which one of the pyroelectric cells has detected a heat source first, is received as the heat source detection history information 1704.

Figure 14A:
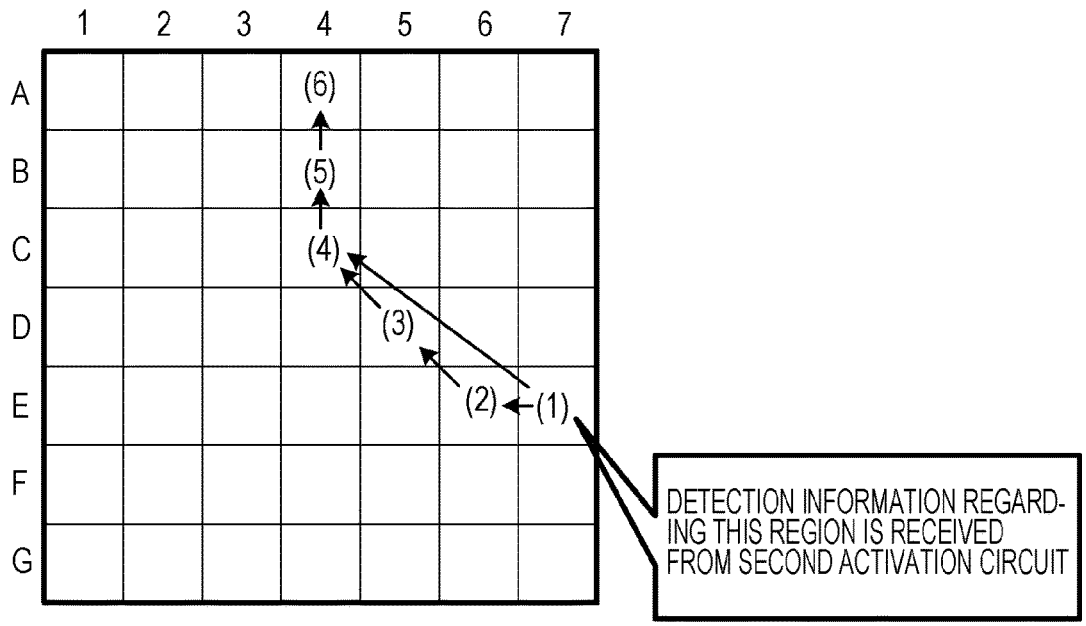
FIGS. 14A and 14B are diagrams illustrating examples of movement of a heat source used for describing the second embodiment.

That is, as illustrated in FIG. 14A, the second analysis circuit 1702 may use information regarding (1) from the heat source detection history information 1704 and information regarding (4), (5), and (6) from the heat source detection signal 508 to analyze the movement of the heat source. Therefore, the second analysis circuit 1702 may recognize that the heat source has moved from E7 to C4, and then to B4 and A4 and that the heat source is approaching the image processing apparatus 100.

By predicting the movement of the heat source and switching to the normal operation state at an early time point, it is possible to recognize that the heat source has moved from E7 to C4 when the second analysis circuit 1702 has received a first heat source detection signal from the pyroelectric cell C4, and determine that the heat source is approaching the image processing apparatus 100.

Figure 14B:
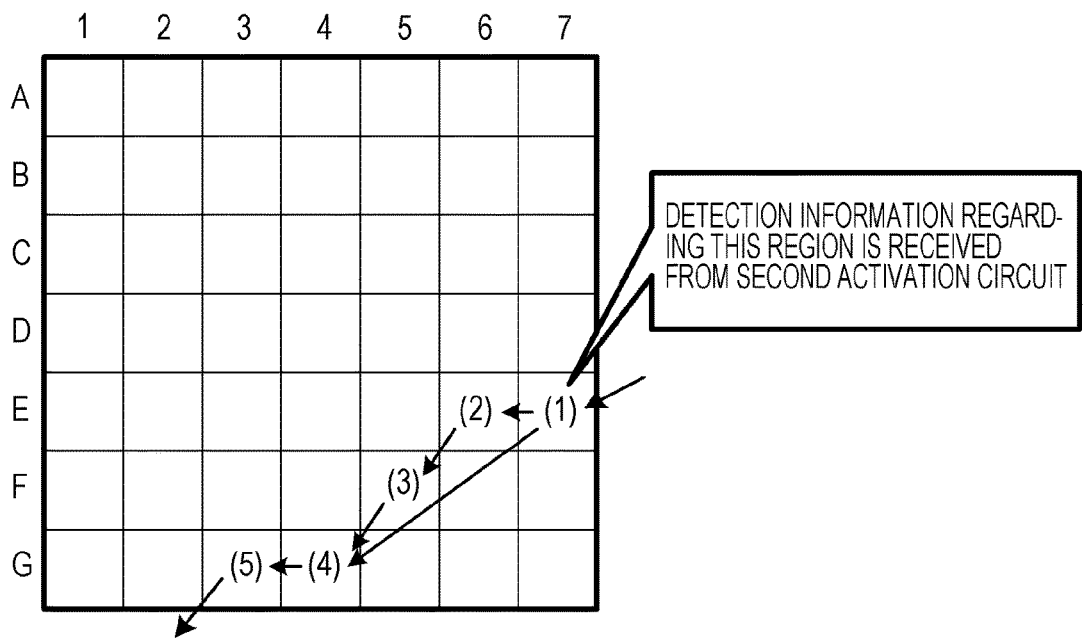

Next, a case in which, as illustrated in FIG. 14B, a heat source is leaving the image processing apparatus 100 by moving from (1) to (2), and then to (3), (4), and (5), that is, from E7 to E6, and then to F5, G4, and G3, will be described in detail.

FIGS. 14A and 14B are diagrams illustrating examples of movement of a heat source used for describing the second embodiment.

In FIG. 14B, the heat source undesirably moves before the activation of the second analysis circuit 1702 is completed after "high (1)" is output as the analysis circuit activation signal 507, and therefore information regarding the detected heat source (1), (2), and (3) is not input to the second analysis circuit 1702 using the heat source detection signal 508.

At this time, the heat source detection storage unit 1902 in the second activation circuit 1701 stores positional information regarding (1), and transmits the positional information to the second analysis circuit 1702 as the heat source detection history information 1704 when the activation of the second analysis circuit 1702 has been completed. On the basis of the heat source detection history information 1704, the second analysis circuit 1702 may recognize that the heat source has moved from (1) to (4), that is, from E7 to G4.

Therefore, by predicting the movement of the heat source and switching to the normal operation state at an early time point, it is possible to recognize that the heat source has moved from E7 to G4 when the second analysis circuit 1702 has received a first heat source detection signal from the pyroelectric cell G4, and determine that the heat source is leaving the image processing apparatus 100.

An operation for switching the image processing apparatus 100 according to the second embodiment including the sensor unit 104 having the above-described configuration from the power saving state to the normal operation state will be described with reference to FIG. 15.

Figure 15:
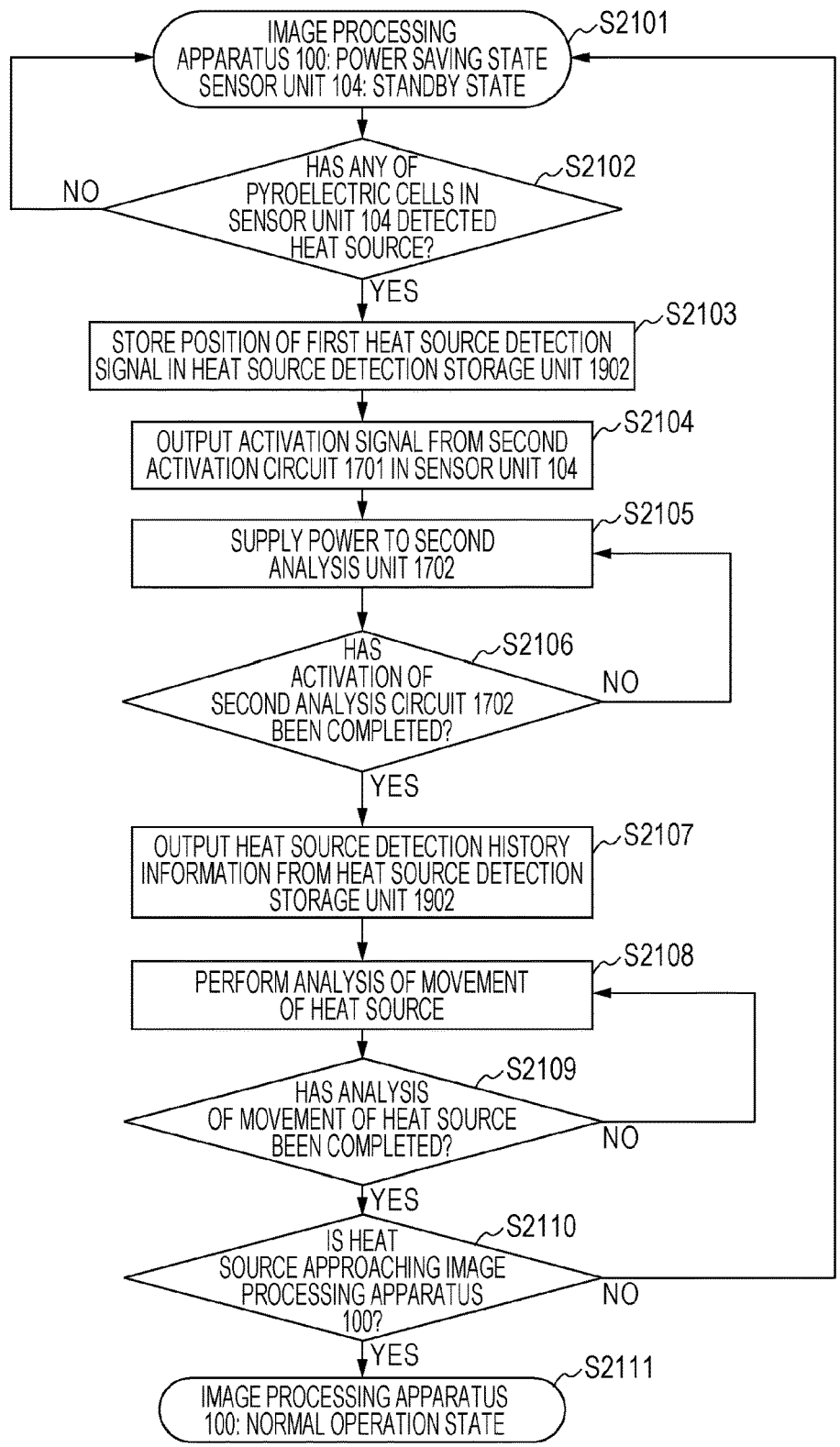
FIG. 15 is a flowchart illustrating an example of an operation for switching an image processing apparatus from the power saving state to the normal operation state according to the second embodiment of the present invention.

FIG. 15 is a flowchart illustrating an example of the operation for switching the image processing apparatus 100 from the power saving state to the normal operation state according to the second embodiment of the present invention. In FIGS. 15, S2101 and S2111 indicate the power saving state and the normal operation state, respectively, of the image processing apparatus 100. S2102 to S2110 indicate steps.

S2101 indicate the power saving state of the image processing apparatus 100. At this time, the sensor unit 104 is in the standby state, in which power is not supplied to the second analysis circuit 1702.

When the pyroelectric cells of the pyroelectric array sensor 501 in the sensor unit 104 have not detected a heat source (NO in S2102) with the image processing apparatus 100 in the power saving state (S2101), the image processing apparatus 100 remains in the power saving state (S2101).

When any of the pyroelectric cells of the pyroelectric array sensor 501 in the sensor unit 104 has detected a heat source (YES in S2102) with the image processing apparatus 100 in the power saving state (S2101), the second activation circuit 1701 in the sensor unit 104 stores positional information regarding the pyroelectric cell that has detected a heat source first in the heat source detection storage unit 1902 (S2103).

The second activation circuit 1701 in the sensor unit 104 outputs the analysis circuit activation signal 507 (S2104).

Upon receiving the analysis circuit activation signal 507 output from the second activation circuit 1701, the sensor unit power control circuit 504 begins to supply power to the second analysis circuit 1702 (S2105).

Upon receiving power from the sensor unit power control circuit 504 and the analysis circuit activation signal 507 from the second activation circuit 1701 in the sensor unit 104, the second analysis circuit 1702 is activated and enters the movement analysis state.

When the activation of the second analysis circuit 1702 has not been completed (NO in S2106), the sensor unit power control circuit 504 keeps supplying power to the second analysis circuit 1702 (S2105), and the second activation circuit 1701 waits for the completion of the activation of the second analysis circuit 1702 (S2106).

When the activation of the second analysis circuit 1702 has been completed (YES in S2106), the second analysis circuit 1702 outputs the activation completion signal 1703 to the second activation circuit 1701.

Upon receiving the activation completion signal 1703, the heat source detection storage unit 1902 of the second activation circuit 1701 determines that the activation of the second analysis circuit 1702 has been completed (YES in S2106), and outputs the heat source detection history information 1704 to the second analysis circuit 1702 (S2107).

The second analysis circuit 1702 receives the heat source detection history information 1704 from the heat source detection storage unit 1902 and the heat source detection signal 508 from the pyroelectric array sensor 501, and performs an analysis of the movement of the heat source (S2108).

When the second analysis circuit 1702 has not completed the analysis of the movement of the heat source (NO in S2109), the second analysis circuit 1702 keeps performing the analysis of the movement of the heat source on the basis of information from the pyroelectric array sensor 501.

When the analysis circuit 1702 has completed the analysis of the movement of the heat source (YES in step S2109), the second analysis circuit 1702 causes the process to proceed to S2110.

In S2110, the second analysis circuit 1702 determines whether or not the heat source is approaching the image processing apparatus 100 on the basis of a result of the analysis.

If the second analysis circuit 1702 determines that the heat source is approaching the image processing apparatus 100 (YES in S2110), the second analysis circuit 1702 outputs the system activation signal 111 to the power control unit 110 in the image processing apparatus 100. Upon receiving the system activation signal 111 output from the second analysis circuit 1702 in the sensor unit 104, the power control unit 110 supplies power to all the components of the image processing apparatus 100 to recover the image processing apparatus 100 from the power saving state to the normal operation state (S2111).

On the other hand, if the second analysis circuit 1702 determines as a result of the analysis that the heat source is leaving the image processing apparatus 100 (NO in S2111), the second analysis circuit 1702 does not output the system activation signal 111. That is, the image processing apparatus 100 remains in the power saving state. In the sensor unit 104, the supply of power to the second analysis circuit 1702 is stopped, and the sensor unit 104 is switched to the standby state (S2101).

As described above, in the second embodiment, when the image processing apparatus 100 is in the power saving state, power consumption of the image processing apparatus 100 in the power saving state may be further reduced by causing the sensor unit 104 to be in the standby state, in which power is not supplied to the second analysis circuit 1702 in the sensor unit 104.

That is, in the image processing apparatus 100 that recovers from the power saving state using the pyroelectric array sensor 501, the power consumption of the image processing apparatus 100 in the power saving state may be reduced by suppressing power consumed by the microcomputer for analyzing results of detection performed by the pyroelectric array sensor 501 in the power saving state.

In addition, when any of the pyroelectric cells of the pyroelectric array sensor 501 has detected a heat source with the image processing apparatus 100 in the power saving state and the sensor unit 104 in the standby state, supply of power to the second analysis circuit 1702 in the sensor unit 104 begins and an analysis of a heat source is performed. If the second analysis circuit 1702 determines that the heat source is approaching the image processing apparatus 100, the image processing apparatus 100 may recover from the power saving state to the normal operation state.

In addition, even if a heat source has undesirably moved before the second analysis circuit 1702 is activated and begins to analyze the heat source because, for example, it takes time to activate the second analysis circuit 1702 to establish the movement analysis state, because the range in which the pyroelectric cells detect the heat source is small, or because the movement speed of the heat source is high, for example, the time taken to make a determination as to whether the heat source is approaching or leaving may be reduced, an incorrect determination as to a result of the analysis may be avoided, and the time taken to complete the analysis may be reduced using the heat source detection history information 1704 and the heat source detection signal 508.

Thus, reduction of the power consumption of the sensor unit 104 in the power saving state and recognition of a human approaching the sensor unit 104 may be realized at a high level. That is, in this embodiment, reduction of power consumption in the power saving state and an analysis of movement of a heat source may both be realized at a high level using the above-described configuration.

Third Embodiment

In the second embodiment, an example of configuration has been described in which, even when a heat source has moved before the second analysis circuit 1702 begins to analyze the heat source after the second analysis circuit 1702 is activated, the time taken to make a determination as to whether the heat source is approaching or leaving may be reduced, an incorrect determination as to a result of the analysis may be avoided, and the time taken to complete the analysis may be reduced using the heat source detection history information 1704, which is positional information regarding a pyroelectric cell that has detected the heat source first.

When it takes time to activate the second analysis circuit 1702 to establish the movement analysis state in the second embodiment, however, an incorrect determination might be made only on the basis of the heat source detection history information 1704 regarding a pyroelectric cell that has detected a heat source first if a plurality of heat sources pass through the detection range of the pyroelectric array sensor 501.

Figure 16A:
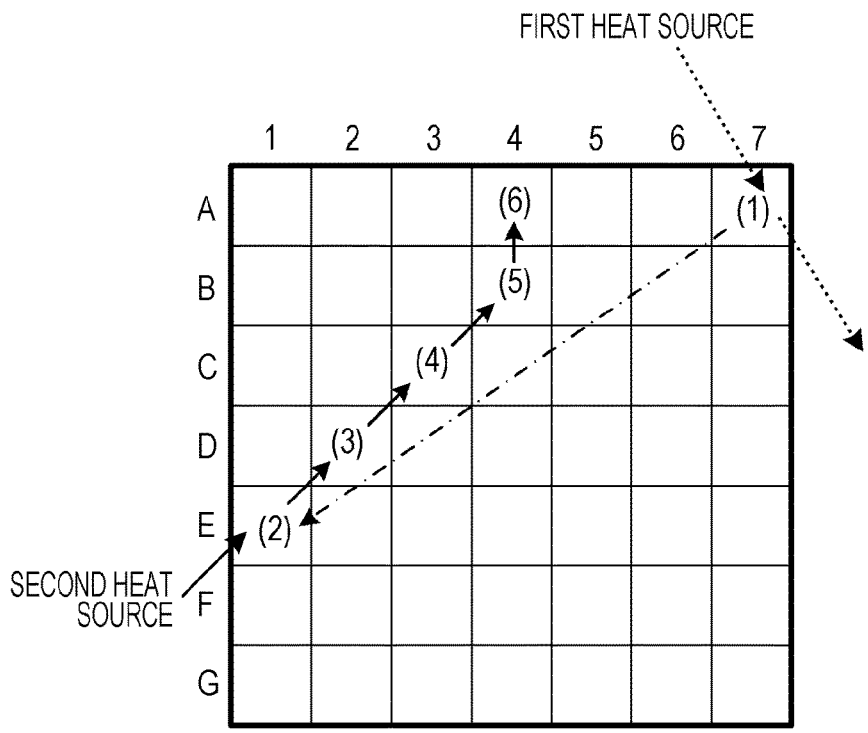
FIGS. 16A and 16B are diagrams illustrating examples of movement of a heat source used for describing a third embodiment.

FIG. 16A is a diagram illustrating a case in which two heat sources (a first heat source and a second heat source) pass through the detection range of the pyroelectric array sensor 501.

If the first heat source passes through the detection range of the pyroelectric array sensor 501 at the pyroelectric cell A7 with the sensor unit 104 in the standby state, the analysis circuit activation signal 507 is output at the time of (1), and the second analysis circuit 1702 is activated. At this time, the heat source detection storage unit 1902 stores positional information regarding the pyroelectric cell A7, which has detected the first heat source.

Assume that, when the activation of the second analysis circuit 1702 has been completed, the first heat source is out of the detection range of the pyroelectric array sensor 501 and the second heat source enters the detection range of the pyroelectric array sensor 501 in order of (2), (3), (4), (5), and (6).

If, in order to predict movement of a heat source at an early time point as in the second embodiment, a determination as to whether a heat source is approaching or leaving the image processing apparatus 100 is made on the basis of the positional information regarding the pyroelectric cell A7 (Grp[3]) from the heat source detection storage unit 1902 and the pyroelectric cell E1 (Grp[2]), at which a heat source has been detected first after the activation of the second analysis circuit 1702, it is determined in this case that the heat source is leaving because the recognized region group number decreases, which is incorrect.

Therefore, in a third embodiment, by including a storage circuit in an activation circuit, causing the storage circuit to store a pyroelectric cell that has detected a heat source when the activation circuit has output the analysis circuit activation signal 507 and movement of the heat source before the activation of the second analysis circuit 1702 is completed, and inputting these pieces of information to the second analysis circuit 1702 that has been supplied with power and that has been activated, it is possible to make a correct determination as to whether the heat source is approaching or leaving.

The third embodiment will be described in detail hereinafter.

The components, the power saving state, and the normal operation state of the image processing apparatus 100 according to the third embodiment are the same as those according to the first embodiment, and accordingly detailed description thereof is omitted here.

One of the characteristics of the third embodiment is the configuration of a sensor unit 104.

Figure 17:
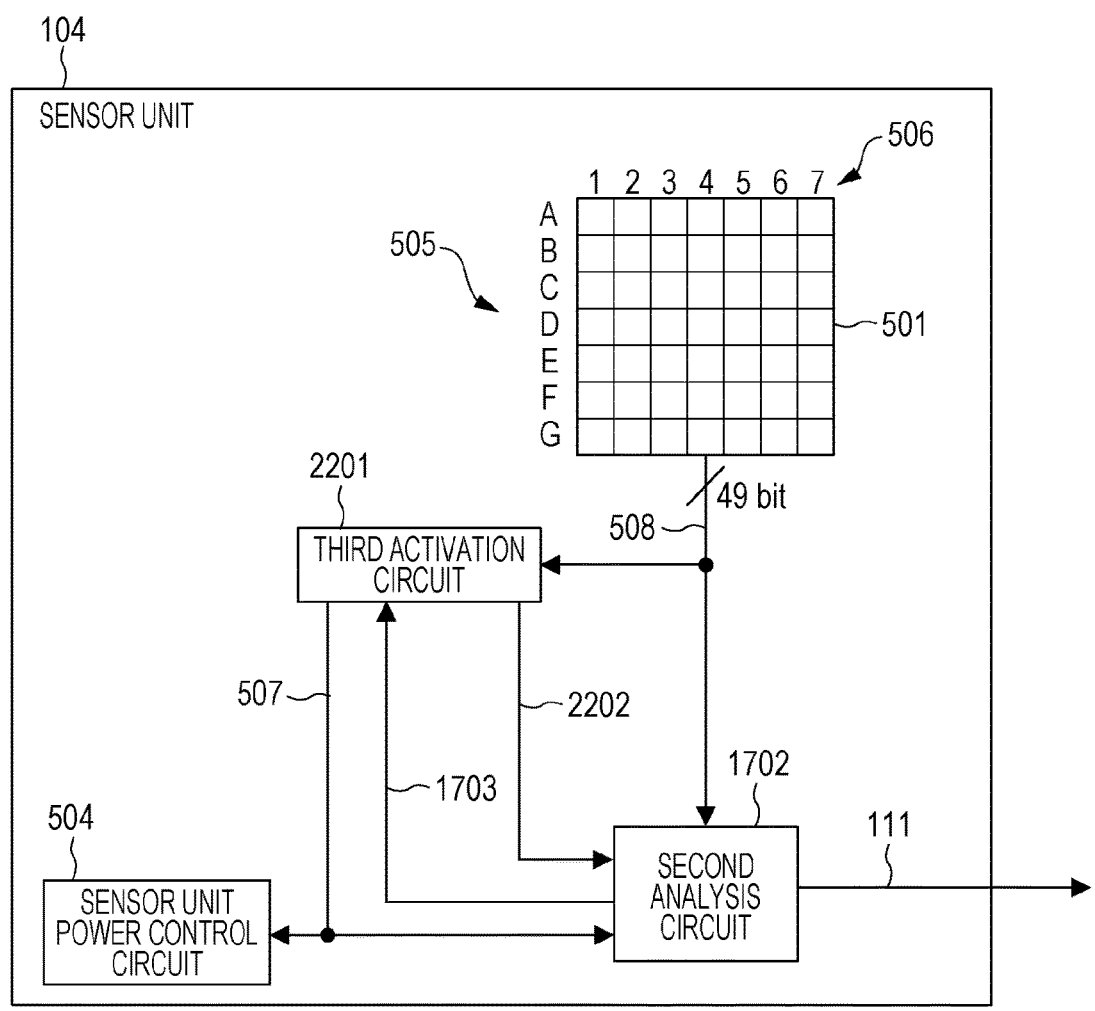
FIG. 17 is a diagram illustrating the internal configuration of a sensor unit according to the third embodiment.

FIG. 17 is a diagram illustrating the internal configuration of the sensor unit 104 according to the third embodiment. The same components as those according to the first and second embodiments are given the same reference numerals as those used in the drawings to describe the first and second embodiments, and accordingly detailed description thereof is omitted here.

The second analysis circuit 1702 according to the third embodiment receives second heat source detection history information 2202 from a third activation circuit 2201, and uses the second heat source detection history information 2202 to analyze movement of a heat source. The second heat source detection history information 2202 will be described in detail later.

Recognition of movement of a heat source by the pyroelectric array sensor 501 and the second analysis circuit 1702 is the same as that according to the first and second embodiments, and accordingly detailed description thereof is omitted here.

In the third embodiment, as in the first and second embodiments, the sensor unit 104 includes the third activation circuit 2201 and the sensor unit power control circuit 504 as illustrated in FIG. 17, and the two operation states, namely the movement analysis state and the standby state, are provided for the sensor unit 104.

In the movement analysis state, the sensor unit power control circuit 504 receives power from the power control unit 110 in the image processing apparatus 100, supplies power to all the components of the sensor unit 104, and performs processes for recognizing and predicting movement of a heat source using the second analysis circuit 1702.

Figure 18:
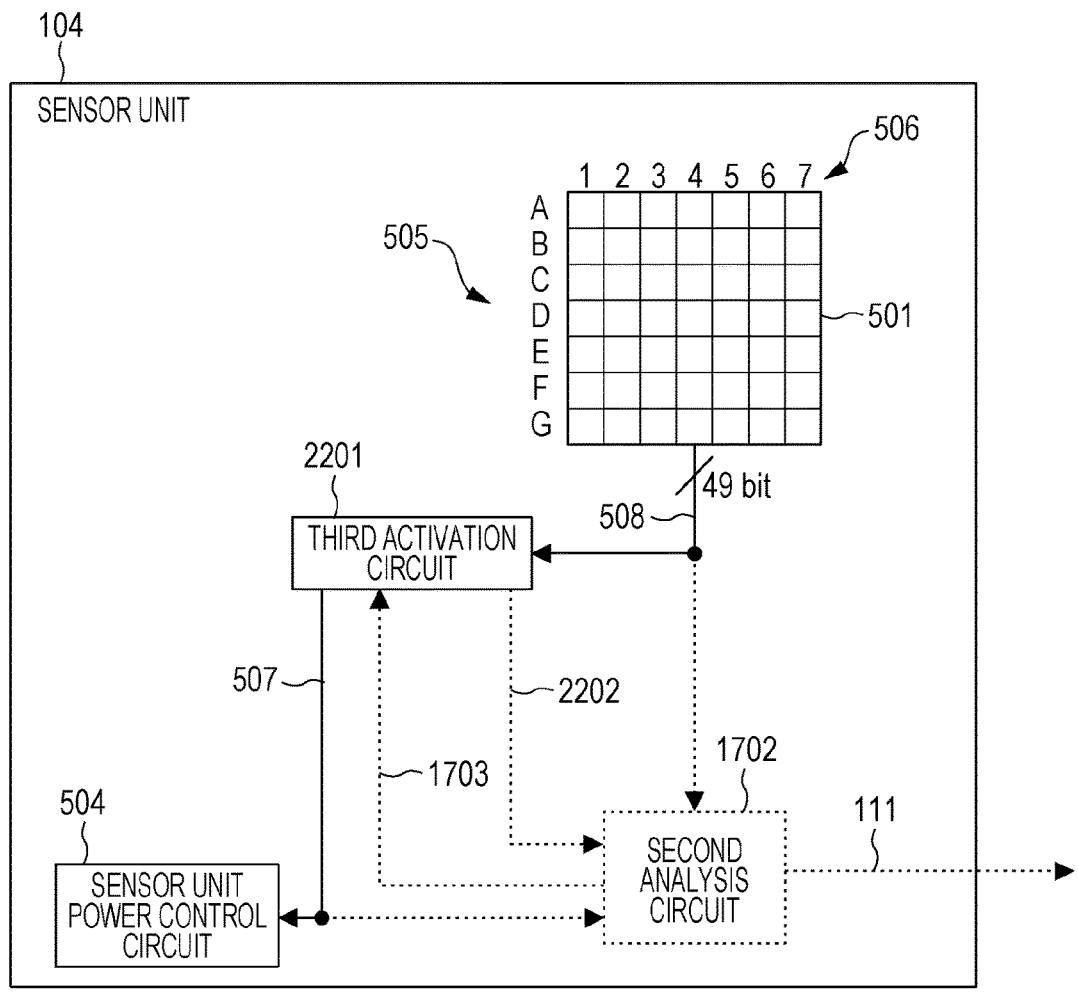
FIG. 18 is a diagram illustrating a power supply state at a time when the sensor unit according to the third embodiment of the present invention is in the standby state.

In the standby state, the sensor unit power control circuit 504 receives power from the power control unit 110 in the image processing apparatus 100 and, as illustrated in FIG. 18, supplies power to the pyroelectric array sensor 501 and the third activation circuit 2201 in the sensor unit 104, but does not supply power to the second analysis circuit 1702.

FIG. 18 is a diagram illustrating a power supply state at a time when the sensor unit 104 according to the third embodiment is in the standby state.

Switching of the sensor unit 104 from the standby state to the movement analysis state is controlled by the third activation circuit 2201. Details will be described hereinafter.

The pyroelectric array sensor 501 and the third activation circuit 2201 are connected to each other by a 49-bit signal line, and each bit transmits a detection signal of each of the pyroelectric cells A1 to G7. Bit 0 transmits a detection signal of the pyroelectric cell A1 and Bit 1 transmits a detection signal of the pyroelectric cell A2. Similarly, Bit 48 transmits a signal of the pyroelectric cell G7.

When any of the pyroelectric cells of the pyroelectric array sensor 501 has detected a heat source, the third activation circuit 2201 outputs the analysis circuit activation signal 507. In this case, when any of the pyroelectric cells has detected a heat source, the third activation circuit 2201 outputs "high (1)" as the analysis circuit activation signal 507, and when none of the pyroelectric cells has detected a heat source, the third activation circuit 2201 outputs "low (0)".

The analysis circuit activation signal 507 is transmitted to the second analysis circuit 1702 and the sensor unit power control circuit 504. Upon receiving "high (1)" as the analysis circuit activation signal 507, the sensor unit power control circuit 504 begins to supply power to the second analysis circuit 1702. In addition, upon receiving "high (1)" as the analysis circuit activation signal 507, the second analysis circuit 1702 receives detection signals from the pyroelectric array sensor 501 and performs processes for analyzing and predicting movement of a heat source.

Figure 19:
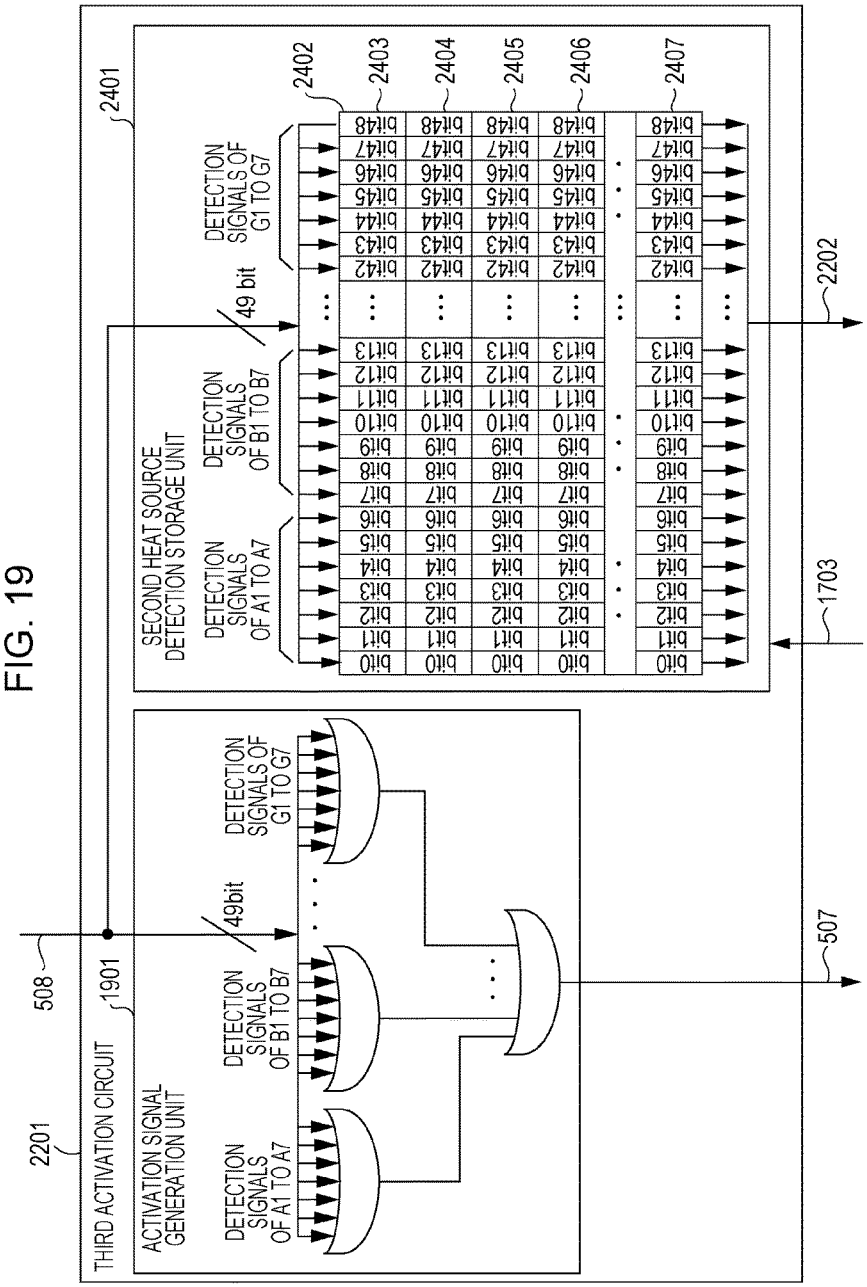
FIG. 19 is a diagram illustrating an example of the configuration of a third activation circuit in the sensor unit according to the third embodiment of the present invention.

As illustrated in FIG. 19, the third activation circuit 2201 has a configuration in which the activation signal generation unit 1901 and a second heat source detection storage unit 2401 are included.

FIG. 19 is a diagram illustrating an example of the configuration of the third activation circuit 2201 in the sensor unit 104 according to the third embodiment of the present invention.

As illustrated in FIG. 19, the activation signal generation unit 1901 has, as in the second embodiment, a configuration in which all the bits of the 49-bit heat source detection signal 508 are logically ORed and (all logical sums of the 49-bit heat source detection signal 508 are) output as the analysis circuit activation signal 507.

By adopting such a configuration, "low (0)" is output when none of the pyroelectric cells A1 to G7 has detected a heat source, and "high (1)" is output as the analysis circuit activation signal 507 when any of the pyroelectric cells A1 to G7 has detected a heat source.

The second heat source detection storage unit 2401 includes a second register unit 2402 including a plurality of registers, each having a bit width of 49 bits and capable of reading and writing.

In the third embodiment, the second register unit 2402 includes ten registers, namely a register A 2403 to a register J 2407. These registers may store a plurality of pieces of positional information (heat source detection signal 508) output from the pyroelectric array sensor 501 in order of detection in such a way as to be able to identify the order of detection. Details of the operation of the second register unit 2402 will be described hereinafter.

When any of the pyroelectric cells of the pyroelectric array sensor 501 has detected a heat source with the sensor unit 104 in the standby state, the register A 2403 in the second register unit 2402 stores position information regarding the pyroelectric cell that has detected the heat source. At this time, the activation signal generation unit 1901 in the third activation circuit 2201 outputs "high (1)" as the analysis circuit activation signal 507. As a result of the analysis circuit activation signal 507, power is supplied to the second analysis circuit 1702 and activation of the second analysis circuit 1702 begins.

If the detected position of the heat source moves before the activation of the second analysis circuit 1702 is completed and the activation completion signal 1703 is input to the third activation circuit 2201, the register B 2404, the register C 2405, and the register D 2406 sequentially store positional information. In this embodiment, all the bits of the second register unit 2402 are set to "0" in a default state.

For example, when the pyroelectric cell A1 of the pyroelectric array sensor 501 has detected a heat source first with the sensor unit 104 in the standby state, Bit 0 of the register A 2403 in the second register unit 2402 stores "1". Thereafter, if the heat source moves to the pyroelectric cell B2 before the activation of the second analysis circuit 1702 is completed, Bit 8 of the register B 2404 stores "1".

When the activation of the second register unit 2402 has been completed and the activation completion signal 1703 output from the second analysis circuit 1702 has become "1)", the second heat source detection storage unit 2401 outputs, to the second analysis circuit 1702 as the second heat source detection history information 2202, pieces of information stored in the register A 2403 and subsequent registers that store the subsequent movement of the heat source one by one.

The second analysis circuit 1702 receives the second heat source detection history information 2202 from the third activation circuit 2201, and uses the second heat source detection history information 2202 to analyze the movement of the heat source. Details will be described hereinafter.

Figure 16B:
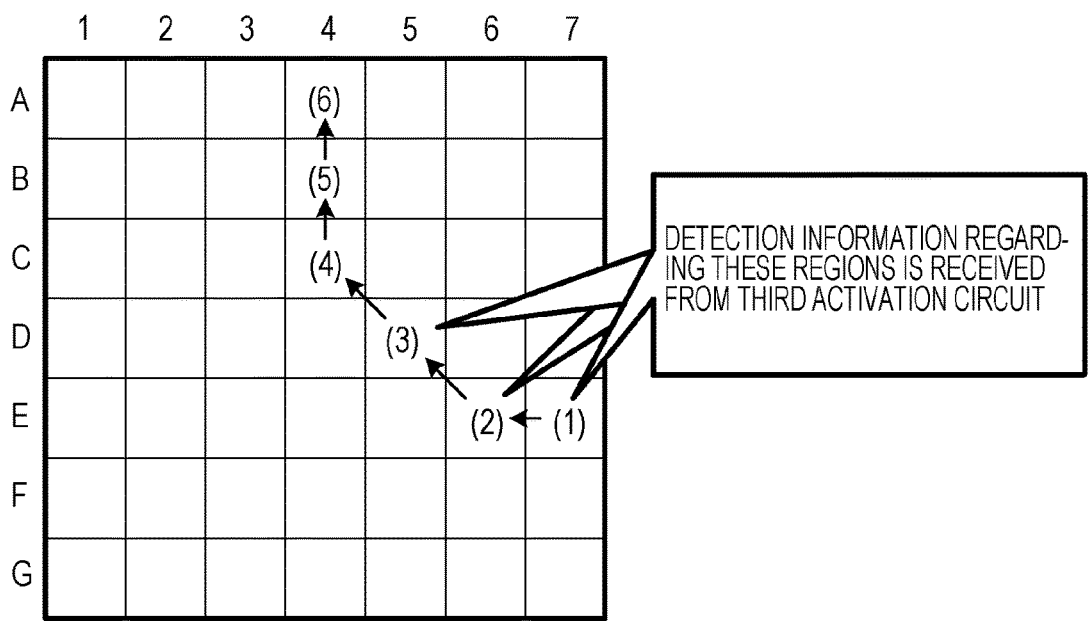

FIG. 16B is a diagram illustrating an example of movement of a heat source according to the third embodiment of the present invention.

As in the above description with reference to FIG. 10 in FIG. 16B, assume that detection signals of the pyroelectric cells have moved from (1) to (2), and then to (3), (4), (5), and (6).

In this case, the pyroelectric cells E7, E6, D5, C4, B4, and A4 detect a heat source in this order. Assume that the sensor unit 104 has been in the standby state and the heat source has moved to the pyroelectric cell C4 before the second analysis circuit 1702 begins to analyze the heat source.

In this case, the second analysis circuit 1702 cannot use information regarding the detected heat source from the pyroelectric cells E7, E6, and D5 on the basis of the heat source detection signal 508.

Therefore, in the third embodiment, the second analysis circuit 1702 outputs the activation completion signal 1703 to the third activation circuit 2201 when the activation thereof has been completed, and receives the second heat source detection history information 2202.

In this case, information regarding "E7", which is information regarding a position at which one of the pyroelectric cells has detected a heat source first, and information regarding "E6" and "D5", which is information regarding movement of the heat source until the activation completion signal 1703 is input to the third activation circuit 2201, are sequentially received as the second heat source detection history information 2202.

Therefore, the second analysis circuit 1702 may use all pieces of heat source detection information regarding (1), (2), (3), (4), (5), and (6) to analyze the movement of the heat source. In FIG. 16B, the second analysis circuit 1702 may recognize that the heat source has moved from the pyroelectric cell E7 to the pyroelectric cell E6, and then to the pyroelectric cells D5, C4, B4, and A4, and may accordingly recognize that the heat source is approaching the image processing apparatus 100.

If the movement of the heat source is predicted and the image processing apparatus 100 is switched to the normal operation state at an early time point, the second analysis circuit 1702 may recognize that the heat source has moved from the pyroelectric cell E7 to E6, and then to the pyroelectric cells D5 and C4 as soon as the second analysis circuit 1702 receives a first heat source detection signal from the pyroelectric cell C4, and it is possible to make a correct determination that the heat source is approaching the image processing apparatus 100.

In the case of the movement pattern illustrated in FIG. 16A, which causes an incorrect determination when the movement is predicted in the second embodiment, the second analysis circuit 1702 may use all the pieces of heat source detection information regarding (1), (2), (3), (4), (5), and (6) to analyze the movement of the heat source. Since the positions of (1) and (2) are not adjacent to each other, the second analysis circuit 1702 may recognize that (1) and (2) are different heat sources, thereby recognizing the movement without making an incorrect determination.

An operation for switching the image processing apparatus 100 according to the third embodiment including the sensor unit 104 having the above-described configuration from the power saving state to the normal operation state will be described with reference to FIG. 20.

Figure 20:
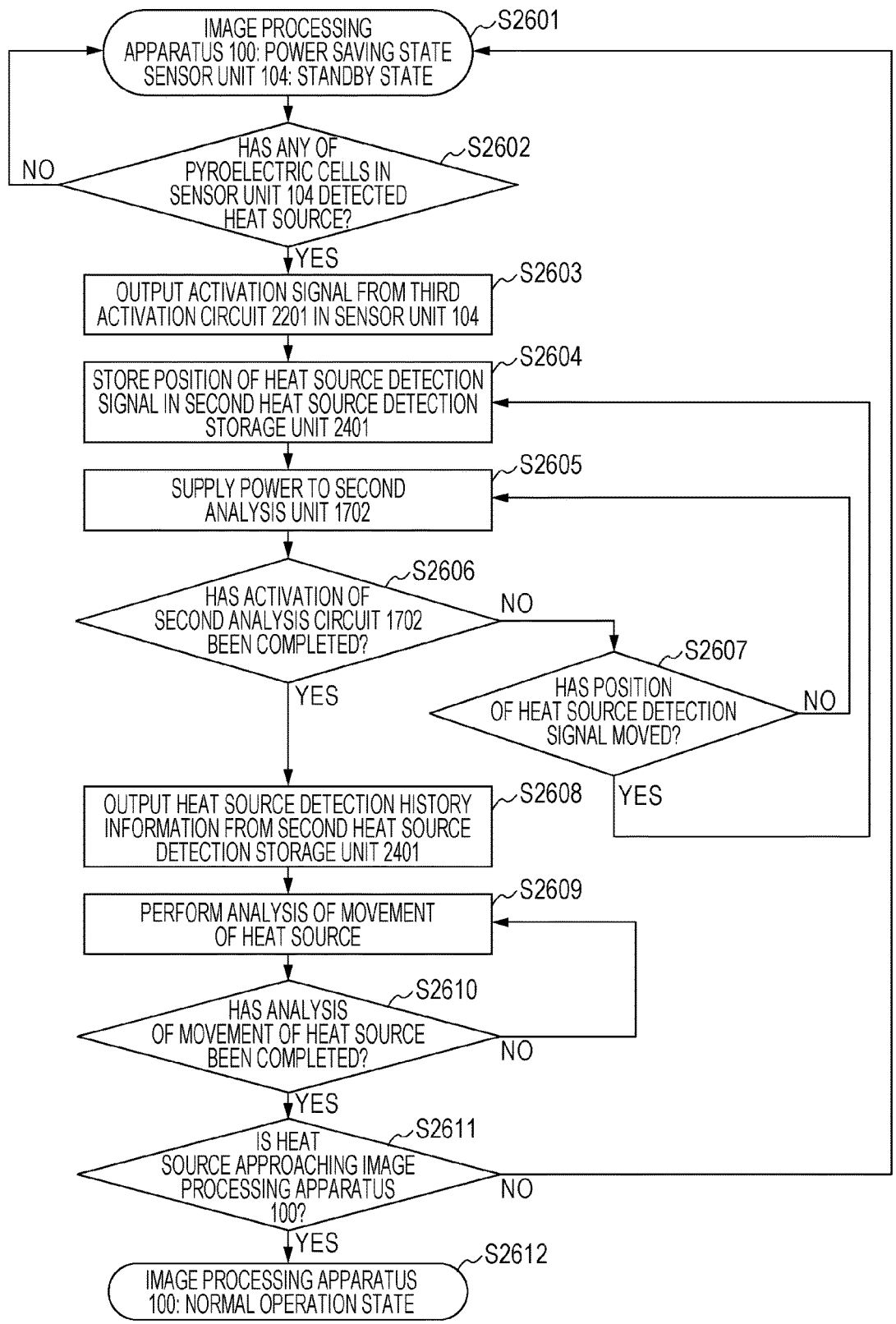
FIG. 20 is a flowchart illustrating an example of an operation for switching an image processing apparatus from the power saving state to the normal operation state according to the third embodiment of the present invention.

FIG. 20 is a flowchart illustrating an example of the operation for switching the image processing apparatus 100 from the power saving state to the normal operation state according to the third embodiment of the present invention. In FIGS. 20, S2601 and S2612 indicate the power saving state and the normal operation state, respectively, of the image processing apparatus 100. S2602 to S2611 indicate steps.

S2601 indicate the power saving state of the image processing apparatus 100. At this time, the sensor unit 104 is in the standby state, in which power is not supplied to the second analysis circuit 1702.

When the pyroelectric cells of the pyroelectric array sensor 501 in the sensor unit 104 have not detected a heat source (NO in S2602) with the image processing apparatus 100 in the power saving state (S2601), the image processing apparatus 100 remains in the power saving state.

When any of the pyroelectric cells of the pyroelectric array sensor 501 in the sensor unit 104 has detected a heat source (YES in S2602) with the image processing apparatus 100 in the power saving state (S2601), the third activation circuit 2201 in the sensor unit 104 outputs the analysis circuit activation signal 507 (S2603).

In addition, the third activation circuit 2201 stores positional information regarding the pyroelectric cell that has detected a heat source first in the second heat source detection storage unit 2401 thereof (S2604). Upon receiving the analysis circuit activation signal 507 output from the third activation circuit 2201, the sensor unit power control circuit 504 begins to supply power to the second analysis circuit 1702 (S2605).

Upon receiving power from the sensor unit power control circuit 504 and the analysis circuit activation signal 507 from the third activation circuit 2201 in the sensor unit 104, the second analysis circuit 1702 is activated and enters the movement analysis state.

If the position of a heat source detection signal changes from that of the heat source detection signal detected previously (YES in S2607) before the activation of the second analysis circuit 1702 is completed (NO in S2606), the third activation circuit 2201 stores the position of the heat source detection signal in the second heat source detection storage unit 2401 (S2604). In addition, the sensor unit power control circuit 504 keeps supplying power to the second analysis circuit 1702 (S2605), and the third activation circuit 2201 waits for the completion of the activation of the second analysis circuit 1702 (S2606).

If the position of a heat source detection signal does not change from that of the heat source detection signal detected previously (NO in S2607) before the activation of the second analysis circuit 1702 is completed (NO in S2606), the third activation circuit 2201 dose not store the position of the heat source detection signal. In this case, the sensor unit power control circuit 504 keeps supplying power to the second analysis circuit 1702 (S2605), and the third activation circuit 2201 waits for the completion of the activation of the second analysis circuit 1702 (S2606).

Upon receiving the activation completion signal 1703, the second heat source detection storage unit 2401 of the third activation circuit 2201 determines that the activation of the second analysis circuit 1702 has been completed (YES in S2606), and outputs the second heat source detection history information 2202 to the second analysis circuit 1702 (S2608).

The second analysis circuit 1702 receives the second heat source detection history information 2202 from the second heat source detection storage unit 2401 and the heat source detection signal 508 from the pyroelectric array sensor 501, and performs an analysis of the movement of the heat source (S2609).

When the second analysis circuit 1702 has not completed the analysis of the movement of the heat source (NO in S2610), the second analysis circuit 1702 keeps performing the analysis of the movement of the heat source on the basis of information from the pyroelectric array sensor 501 (S2609).

When the analysis circuit 1702 has completed the analysis of the movement of the heat source (YES in step S2610), the second analysis circuit 1702 causes the process to proceed to S2611.

In S2611, the second analysis circuit 1702 determines whether or not the heat source is approaching the image processing apparatus 100 on the basis of a result of the analysis.

If the second analysis circuit 1702 determines as a result of the analysis that the heat source is approaching the image processing apparatus 100 (YES in S2611), the second analysis circuit 1702 outputs the system activation signal 111 to the power control unit 110 in the image processing apparatus 100. Upon receiving the system activation signal 111 output from the second analysis circuit 1702 in the sensor unit 104, the power control unit 110 supplies power to all the components of the image processing apparatus 100 to recover the image processing apparatus 100 from the power saving state to the normal operation state (S2612).

On the other hand, if the second analysis circuit 1702 determines as a result of the analysis that the heat source is leaving the image processing apparatus 100 (NO in S2611), the second analysis circuit 1702 does not output the system activation signal 111. That is, the image processing apparatus 100 remains in the power saving state. In the sensor unit 104, the supply of power to the second analysis circuit 1702 is stopped, and the sensor unit 104 is switched to the standby state (S2601).

As described above, in the third embodiment, when the image processing apparatus 100 is in the power saving state, the power consumption of the image processing apparatus 100 in the power saving state may be further reduced by causing the sensor unit 104 to be in the standby state, in which power is not supplied to the second analysis circuit 1702 in the sensor unit 104.

That is, in the image processing apparatus 100 that recovers from the power saving state using the pyroelectric array sensor 501, the power consumption of the image processing apparatus 100 in the power saving state may be reduced by suppressing power consumed by the microcomputer for analyzing results of detection performed by the pyroelectric array sensor 501 in the power saving state.

In addition, when any of the pyroelectric cells of the pyroelectric array sensor 501 has detected a heat source with the image processing apparatus 100 in the power saving state and the sensor unit 104 in the standby state, supply of power to the second analysis circuit 1702 in the sensor unit 104 begins and an analysis of a heat source is performed. If the second analysis circuit 1702 determines that the heat source is approaching the image processing apparatus 100, the image processing apparatus 100 may recover from the power saving state to the normal operation state.

In addition, even if a heat source has undesirably moved before the second analysis circuit 1702 is activated and begins to analyze the heat source because, for example, it takes time to activate the second analysis circuit 1702 to establish the movement analysis state, because the range in which the pyroelectric cells detect the heat source is small, or because the movement speed of the heat source is high, it is possible to make a correct determination as to whether the heat source is approaching or leaving using the second heat source detection history information 2202, which is information regarding the entire movement, and the heat source detection signal 508.

Thus, reduction of the power consumption of the sensor unit 104 in the power saving state and recognition of a human approaching the sensor unit 104 may be realized at an even higher level. That is, in this embodiment, reduction of power consumption in the power saving state and an analysis of movement of a heat source may both be realized at an even higher level using the above-described configuration.

Although the detection technique in the present invention is used for controlling power supplied to an image processing apparatus in this embodiment, the detection technique may be used for controlling power supplied to another type of electronic apparatus.

For example, the detection technique in the present invention may be applied to an information processing apparatus (for example, an information processing apparatus for guidance installed in a lobby of a company, a tourist spot, or the like) that displays content in accordance with the type of customer and that provides the customer with information and the like. Such an information processing apparatus might perform control such as recovering from a sleep state to a normal state when a customer has been detected and displaying a certain type of content (guidance, sightseeing information, or the like) or the like, and is considered to have the same problem as the image processing apparatuses according to the above embodiments in terms of the detection range of a human detection sensor. When the present invention is applied to such an information processing apparatus, it is possible to recognize that a control operation that uses the human detection sensor has entered a state that is not intended by a user by checking the detection range of the human detection sensor on the basis of the position of the detection range of the human detection sensor relative to the information processing apparatus. Therefore, the detection range of the human detection sensor may be adjusted to an appropriate state, and the control operation using the human detection sensor may be adjusted to a state intended by the user. Such an information processing apparatus may recover from the sleep state and display content when a human has been detected in a particular region (in front of the apparatus or the like), but may only recover from the sleep state when a human has been detected in other regions (sides of the apparatus or the like).

In addition, the present invention may be applied to a camera. In this case, the camera may recover from a sleep state and capture and record images when a human has been detected in a particular region (for example, a region that needs to be monitored) by a sensor included in the camera, but may only recover from the sleep state when a human has been detected in other regions (sides of the apparatus or the like).

The present invention may be applied to home appliances that perform various operations by detecting a human, such as an air conditioner, a television set, a lighting device.

Furthermore, the detection technique in the present invention may be directly utilized as a detection device. In this case, in the detection device including an analysis circuit that determines the movement direction of a human using a human detection unit such as a pyroelectric array sensor, reduction of power consumption and a process for rapidly and correctly determining the movement direction may be realized at a high level.

Needless to say, the configuration and the content of various pieces of data described above are not limited to those described above, and various types of configurations and content may be adopted in accordance with usage and a purpose.

Although the embodiments have been described above, the present invention may be applied to, for example, a system, an apparatus, a method, a program, or a storage medium. More specifically, the present invention may be applied to a system including a plurality of apparatuses or may be applied to an apparatus including only one device.

Configurations obtained by combining the above embodiments are all included in the scope of the present invention.
Other Embodiments The present invention may be realized by executing the following process. That is, the present invention may be realized by a process executed by supplying software (program) that realizes the functions of the above-described embodiments to a system or an apparatus through a network or one of various types of storage media and reading the program using a computer (or a CPU, a microprocessor unit (MPU), or the like) included in the system or the apparatus.

In addition, the present invention may be applied to a system including a plurality of apparatuses or may be applied to an apparatus including only one device.

The present invention is not limited to the above embodiments and may be modified in various ways (include organic combinations between the embodiments) on the basis of the scope of the present invention. Such modifications are not excluded from the scope of the present invention. That is, configurations obtained by combining the above embodiments and the modifications of the embodiments are all included in the scope of the present invention.

According to the present invention, in an image processing apparatus that recovers from the power saving state by detecting an approaching object using a detection unit such as a pyroelectric array sensor, further reduction of power consumption in the power saving state and rapid recovery from the power saving state may both be realized at a high level.
Other Embodiments Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-265616, filed Dec. 4, 2012, which is hereby incorporated by reference herein in its entirety.

What is claimed is:

1. An image processing apparatus that is able to operate in a first power state and a second power state in which power consumption is lower than power consumption in the first power state, the image processing apparatus comprising:
    an array sensor which includes a plurality of elements, each of the plurality of elements sensing heat and outputting a signal corresponding to sensed heat;
    a storage which stores information indicating one or more signals output from the array sensor;
    an analysis circuit which determines whether to output a predetermined signal for shifting the image processing apparatus from the second power state to the first power state based on the information stored in the storage;
    a power controller which turns off the analysis circuit; and
    an activation circuit which receives a plurality of signals output from the plurality of elements and outputs an activation signal for turning on the analysis circuit in accordance with any one of the plurality of signals, wherein the power controller turns on the analysis circuit in accordance with the activation signal.

2. The image processing apparatus according to claim 1, wherein the storage has a plurality of registers which stores information indicating elements corresponding to input signals in order in which signals output from the plurality of elements are input, and
    wherein, the analysis circuit determines whether to output the predetermined signal based on the information indicating the elements stored in the plurality of registers.

3. The image processing apparatus according to claim 2, wherein the information stored in the plurality of registers is history information.

4. The image processing apparatus according to claim 1, wherein the array sensor is an array sensor in which the plurality of elements is arranged in a line or in a matrix.

5. The image processing apparatus according to claim 4, wherein the array sensor is a pyroelectric array sensor.

6. The image processing apparatus according to claim 1, wherein each of the plurality of elements receives infrared radiation.

7. The image processing apparatus according to claim 1, further comprising a printer which prints an image on a sheet.

8. The image processing apparatus according to claim 1, further comprising a printing unit, a reading unit, and a processor which controls the printing unit and the reading unit, and power supply to the processor is stopped in the second power state.

9. The image processing apparatus according to claim 1, wherein both the analysis circuit and the activation circuit receives a plurality of signals output from the plurality of elements.

10. The image processing apparatus according to claim 1, further comprising:
    a power control unit which shifts a power state of the image processing apparatus to the first power state from the second power state in accordance with the predetermined signal.

11. The image processing apparatus according to claim 1, wherein the analysis circuit outputs an activation complete signal to the activation circuit when the an activation of the analysis circuit is completed, and the activation circuit outputs the information stored in the storage to the analysis circuit in accordance with the activation complete signal.

12. A method for controlling an image processing apparatus that is able to operate in a first power state and a second power state in which power consumption is lower than power consumption in the first power state, the method comprising the steps of:
- using an array sensor which includes a plurality of elements, each of the plurality of elements sensing heat and outputting a signal corresponding to sensed heat;
- storing information indicating one or more signals output from the array sensor;
- determining, by an analysis circuit whether to output a predetermined signal for shifting the image processing apparatus from the second power state to the first power state based on the information stored in the storage;
- turning off the analysis circuit using a power controller; and
- receiving, by an activation circuit a plurality of signals output from the plurality of elements and outputs an activation signal for turning on the analysis circuit in accordance with any one of the plurality of signals, wherein the power controller turns on the analysis circuit in accordance with the activation signal.

\* \* \* \* \*